(12) United States Patent
Molteni et al.

(10) Patent No.: US 7,613,142 B2
(45) Date of Patent: *Nov. 3, 2009

(54) METHOD FOR A WIRELESS STATION TO DETERMINE NETWORK METRICS PRIOR TO ASSOCIATING WITH AN ACCESS POINT OF A WIRELESS NETWORK

(75) Inventors: Marco Molteni, Antibes (FR); Massimo G Lucchina, Villeneuve Loubet (FR)

(73) Assignee: Cisco Technology, Inc., San Jose, CA (US)

( * ) Notice: Subject to any disclaimer, the term of this patent is extended or adjusted under 35 U.S.C. 154(b) by 1104 days.

This patent is subject to a terminal disclaimer.

(21) Appl. No.: 10/274,600

(22) Filed: Oct. 21, 2002

(65) Prior Publication Data
US 2004/0066759 A1    Apr. 8, 2004

Related U.S. Application Data

(63) Continuation-in-part of application No. 10/263,632, filed on Oct. 3, 2002.

(51) Int. Cl.
*H04W 4/00* (2009.01)
*H04B 7/216* (2006.01)
(52) U.S. Cl. .............. 370/328; 370/331; 370/335; 370/342
(58) Field of Classification Search .......... 709/238; 370/332, 310, 337; 455/450
See application file for complete search history.

(56) References Cited

U.S. PATENT DOCUMENTS

| 5,907,544 A | 5/1999 | Rypinski ............... 370/337 |
| 6,363,056 B1 | 3/2002 | Beigi et al. ............. 370/252 |

(Continued)

FOREIGN PATENT DOCUMENTS

WO    WO/01/37517 A2    5/2001

(Continued)

OTHER PUBLICATIONS

"Monitoring the Router and Network", *Configuration Fundamentals Configuration Guide*, Cisco Systems, Inc., Jan. 17, 2003.

(Continued)

*Primary Examiner*—Melanie Jagannathan
(74) *Attorney, Agent, or Firm*—Dov Rosenfeld; INVENTEK

(57) ABSTRACT

In a wireless station, a method includes, prior to the station being associated with a wireless network, wirelessly receiving L2 frames transmitted from one or more wireless access points (APs) of one or more wireless networks that the station can hear, and gathering information about the received L2 data units, including L2 information and L3 information. The method further includes maintaining the gathered information as a wireless network database that includes for each wireless network, a unique identifier of the wireless network; an indication of the quality of communication between the station and the AP of the wireless network; and one or more L3 advertisements from one or more IP-enabled service providers that the AP of the wireless network transmits. The indication of the quality of communication between the AP of the wireless network includes one or more network performance metrics obtained by temporarily associating with the AP, sending one or more probe packets to the AP, and collecting the one or more network performance metrics.

74 Claims, 7 Drawing Sheets

U.S. PATENT DOCUMENTS

| | | | |
|---|---|---|---|
| 6,446,121 B1 | 9/2002 | Shah et al. | 709/224 |
| 6,496,704 B2 | 12/2002 | Yuan | 455/466 |
| 6,625,135 B1 * | 9/2003 | Johnson et al. | 370/332 |
| 6,810,428 B1 * | 10/2004 | Larsen et al. | 709/238 |
| 7,082,114 B1 * | 7/2006 | Engwer et al. | 370/331 |
| 7,089,014 B2 * | 8/2006 | Brown et al. | 455/450 |
| 7,120,138 B2 * | 10/2006 | Soomro et al. | 370/343 |
| 7,130,614 B2 * | 10/2006 | Sreemanthula et al. | 455/411 |
| 2001/0036834 A1 | 11/2001 | Das et al. | 455/458 |
| 2001/0046223 A1 | 11/2001 | Malki et al. | 370/338 |
| 2002/0026527 A1 | 2/2002 | Das et al. | 709/245 |
| 2002/0078238 A1 * | 6/2002 | Troxel et al. | 709/245 |
| 2003/0087646 A1 | 5/2003 | Funato et al. | 455/456 |
| 2004/0066759 A1 | 4/2004 | Molteni et al. | 370/329 |
| 2004/0218573 A1 | 11/2004 | Takahashi et al. | 370/338 |
| 2005/0047372 A1 | 3/2005 | Yano et al. | 370/331 |
| 2005/0094641 A1 | 5/2005 | Yun et al. | 370/395.2 |
| 2005/0101321 A1 | 5/2005 | Ikeda et al. | 455/435.1 |

FOREIGN PATENT DOCUMENTS

WO      WO/02/25506 A1      3/2002

OTHER PUBLICATIONS

"Cisco Service Assurance Agent User Guide", pp. 1-18, Cisco Systems, Inc.

"Performance Measurement Tools Taxonomy", co-sponsored by Cisco Systems, Inc., available on http://www.caida.org/tools/taxonomy/performance.xml.

"Network Monitoring Using Cisco Service Assurance Agent", *Cisco IOS Configuration Fundamentals Configuration Guide*, Cisco Systems, Inc., Jan. 15, 2003.

"Using Cisco Service Assurance Agent and Internetwork Performance Monitor to Manage Quality of Service in Voice over IP Networks", Cisco Systems, Inc.

"Internet Protocols", Chapter 30, *Internetworking Technology Overview*, Jun. 1999.

Internet Technical Resources: Traffic measurement tools, pp. 1-3, available on http://www.cs.columbia.edu/~hgs/internet/tools.html.

Internet-draft: D.B. Johnson and C. Perkins, "Mobility Support in Ipv6", *IETF Mobile IP Working Group*, Mar. 22, 2002.

"Netramet—a Network Traffic Flow Measurement Tool", pp. 1-2, available on http://www.caida.org/tools/measurement/netramet/.

* cited by examiner

| 503 | 505 | 507 |
|---|---|---|
| SSID-1 | L2 Info: Sig Strgth, ... | L3 Info: FAs, HAs, ... |
| SSID-2 | L2 Info: Sig Strgth, ... | L3 Info: FAs, HAs, ... |
| ⋮ | ⋮ | ⋮ |
| SSID-N | L2 Info: Sig Strgth, ... | L3 Info: FAs, HAs, ... |

| 513 | 515 | 517 | 519 |
|---|---|---|---|
| SSID-1 | L2: Sig Strgth, ... | L3: FAs, ARs, HAs, ... | Metrics: Delay to AP, ... |
| SSID-2 | L2: Sig Strgth, ... | L3: FAs, ARs, HAs, ... | Metrics: Delay to AP, ... |
| ⋮ | ⋮ | ⋮ | ⋮ |
| SSID-N | L2: Sig Strgth, ... | L3: FAs, ARs, HAs, ... | Metrics: Delay to AP, ... |

METHOD FOR A WIRELESS STATION TO DETERMINE NETWORK METRICS PRIOR TO ASSOCIATING WITH AN ACCESS POINT OF A WIRELESS NETWORK

RELATED PATENT APPLICATIONS

This invention is a continuation-in-part of U.S. patent application Ser. No. 10/263,632 to Molteni, et al., titled AN L2 METHOD FOR A WIRELESS STATION TO LOCATE AND ASSOCIATE WITH A WIRELESS NETWORK IN COMMUNICATION WITH A MOBILE IP AGENT, filed Oct. 3, 2002, Attorney/Agent Docket CISCO-5156. Such U.S. patent application Ser. No. 10/218,515 is incorporated herein by reference.

BACKGROUND

Wireless networks such as wireless local area networks (WLANs) are known. In a WLAN, stations (STAs) are able to communicate wirelessly within a local network. In an infrastructure network, all communication is via an access point (AP) that acts as a base station. Any entity on the WLAN can also communicate with a node on any other wired or wireless network that is connected to the WLAN, e.g., via the access point.

Mobile IP is a well known extension of the Internet Protocol (IP) that enables a node on an IP-based network to change its physical attachment point in the network, e.g., the Internet, while retaining the same IP address by which it is identified on its home network. Agents such as home agents and foreign agents (collectively, "mobility agents") that provide Mobile IP services send IP packets that include advertisements of the services they provide. Thus, determining availability of Mobile IP services is a process that occurs at the network layer (L3) of the communication protocol.

The association of a wireless station to an access point occurs at the data link layer (L2), i.e., at a lower protocol layer than Mobile IP services. Thus, in the prior art, the association between an AP and a station occurs at a protocol layer wherein there is ignorance of Mobile IP services, and thus occurs without regard to whether the AP is in communication with any mobility agents.

Above-mentioned and incorporated-by-reference U.S. patent application Ser. No. 10/263,632 to Molteni, et al., titled AN L2 METHOD FOR A WIRELESS STATION TO LOCATE AND ASSOCIATE WITH A WIRELESS NETWORK IN COMMUNICATION WITH A MOBILE IP AGENT, (hereinafter the "Parent Invention") describes how a wireless station can create a database of WLAN access points that the station can hear, called the WLAN database herein. The WLAN database includes for each WLAN whose AP the station can hear L2 information such as the Service Set Identifier (SSID) of the wireless network that uniquely identifies the WLAN, and the signal strength of L2 frames from the AP of the WLAN. The WLAN database also includes L3 information such as any advertisements from mobility agents that the AP of the WLAN transmits. Such L3 information is collected at L2 prior to the station being associated with any AP.

The Parent Invention provides a method and apparatus that enables a station of a WLAN to discover, prior to association, whether or not one or more candidate APs for association that are in communication with mobility agents, e.g. with home agents and/or foreign agents. The parent invention also describes selecting for association a WLAN from the WLAN database whose AP is in communication with a mobility agent so that the wireless station can benefit from and/or provide Mobile IP services. When the station is in communication with a foreign agent (IPv4) or access router (IPv6), the wireless station can become a mobile node. A mobile node is a node of a network that can change its point of attachment.

One aspect of the Parent Invention is when the station is a router. By ensuring that the router associates with a WLAN whose AP transmitted a foreign agent advertisement from a foreign agent (in the case of IPv4) or from an access router (in the case of IPv6), the router also becomes a mobile node by associating with a WLAN in communication with the foreign agent (or access router). A router that is a mobile node is called a mobile router.

While the WLAN database may provides information on the signal strength of the wireless link between the station and the APs of the WLANs in the WLAN database, there is no latency information provided regarding communication between the station and the AP of the WLAN. Furthermore, there is no information provided regarding the communication link beyond the AP of the WLAN. It would be advantageous for the station to also have available other network performance metrics such as response time useful, for example, as quality of service (QoS) parameters, and not only of the wireless link to the AP, but also of the link to the mobility agent (in the case of Mobile IP services) or of the link to any other service provider in the general case.

Such quality of service information is useful, for example, if the station is to participate in voice over IP (VoIP) or other services wherein such network performance metrics as one or more of the response time, availability, jitter (interpacket delay variance), connect time, throughput, and packet loss are important.

SUMMARY

One embodiment of the present invention is a method that operates in a wireless station that includes a processor, a memory, and a wireless network device. The method includes, prior to the station being associated with a wireless network via the wireless network device, wirelessly receiving link layer (L2) data units transmitted from one or more wireless access points (APs) of one or more wireless networks that the station can hear, and gathering information about the received L2 data units, including L2 information and network layer (L3) information. The method further includes maintaining the gathered information in the memory in the form of a wireless network database.

Another embodiment of the invention is a wireless station that includes a processor, a memory coupled to the processor, and a wireless network device coupled to the processor. The memory is loadable with a protocol stack and instructions for the processor to carry out the method described in the preceding paragraph.

The wireless network database including for each wireless network whose access point the station can hear, the gathered L2 information and the gathered L3 information. In one embodiment, the wireless network database includes, for each wireless network whose access point the station can hear: a unique identifier of the wireless network; an indication of the quality of communication between the station and the AP of the wireless network; and one or more L3 advertisements from one or more IP-enabled service providers that the AP of the wireless network transmits.

In one embodiment, the indication of the quality of communication between the AP of the wireless network includes one or more network performance metrics obtained by temporarily associating with the AP, sending one or more probe packets to the AP, and collecting the one or more network performance metrics.

In one embodiment, the one or more network performance metrics include one or more of the set of metrics consisting of response time, one-way delay, jitter, packet loss statistics, data link switching peer tunnel performance, and one or more Website performance metrics such as DNS lookup, TCP connect and HTTP transaction time.

According to one aspect of the invention, one or more of the IP-enabled service providers are mobility agents, such that an L3 process can select an AP to associate with from the wireless network database based on one or more of whether or not the AP is in communication with a mobility agent and the indication of the quality of communication.

BRIEF DESCRIPTION OF THE DRAWINGS

FIG. 5A shows an embodiment of a WLAN database that includes L2 information and L3 information. FIG. 5B shows another embodiment of a WLAN database that also includes one or more network performance metrics.

DETAILED DESCRIPTION

One aspect of the invention is gathering information at a wireless station about the wireless networks that the station can hear prior to the station associating with a wireless network. In one embodiment, the wireless network is an infrastructure network that includes an access point. The information gathered includes link layer (L2) information and network layer (L3) information, such as whether or not the access point of the wireless station is in communication with a mobility agent such as a foreign agent. The information gathered further includes one or more network performance metrics such as the latency between the station and the AP or between the station and a target node in communication with the access point.

By association is meant the procedure used to establish a binding between an access point of an infrastructure wireless network and a station, to make the station part of the wireless network managed by the AP.

The gathering of the information provides for a process-e.g., an L3 process at the station-one or more selection criteria for selecting with what WLAN the station is to associate.

Another aspect of the invention is providing at an access point of a wireless network a responder to probe packets sent by a wireless station to determine one or more network performance metrics such that that station can select which WLAN to associate with by sending probe packets to the AP. The access point's responder responds to the probe packets to provide the station with the one or more network performance metrics between the station and the access point.

Figure 1:
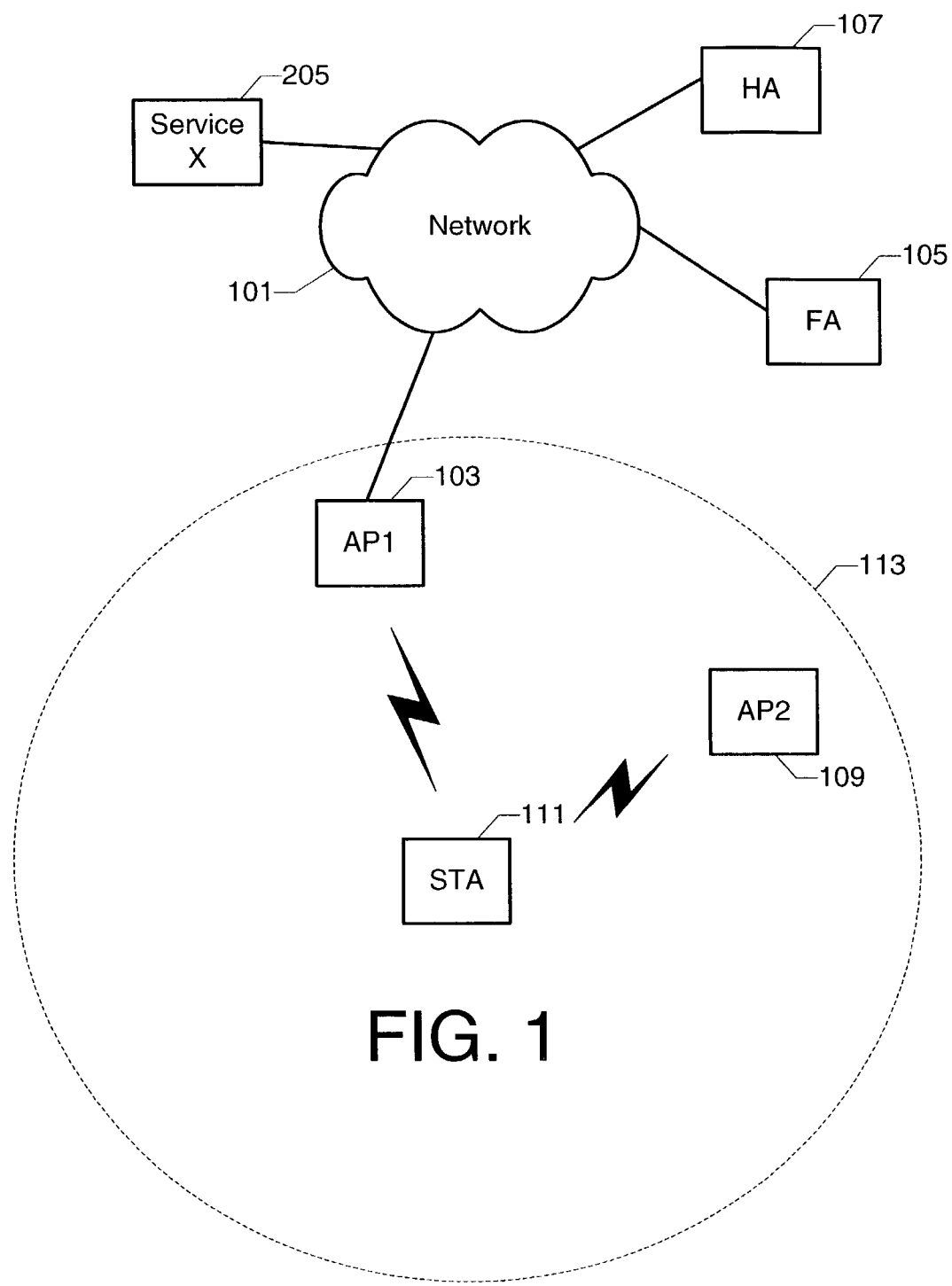
FIG. 1 shows in simplified form one example of a network topology in which embodiments of the present invention can operate.

FIG. 1 shows one network configuration in which embodiments of the invention may operate. A network 101 is in communication with an access point 103 (AP1) of a first infrastructure wireless local area network (WLAN). The network 101 may be an internetwork, i.e., a network of networks, and may be private or public. One example of network 101 being public and an internetwork is network 101 being the Internet. AP1 103 is in communication, e.g., via network 101 with a Mobile IP foreign agent 105, with a Mobile IP home agent 107, with an access router 115, and also with a server 117 that provides some service (called service-X). The foreign agent provides Mobile IP services under IPv4 and periodically sends foreign agent advertisements. The access router provides Mobile IP services under IPv6 and periodically sends router advertisements. Note that in Mobile IP for IPv4, the foreign agent provides a care-of address for a mobile node, while in Mobile IPv6, no foreign agent is used. The IP packets themselves include the care-of address, so all that is required for Mobile IP under IPv6 is communication to an access router capable of routing packets to the Mobile IP node's home address.

A wireless station STA 111 is to act as a mobile node by associating with an access point of a wireless network that is in communication with a foreign agent. The wireless station is capable of wirelessly communicating within a range shown as 113. Thus, STA 111 is capable of communicating with the access point AP1 103, and with a second access point 109 of a second infrastructure wireless network. In the example of FIG. 1, AP2 109 is not in communication with the foreign agent 105, the access router 115, the home agent 107, or the server 117.

In one embodiment, the first and second WLANs operate according to one of the IEEE 802.11 standards for WLANs. According to that standard, an access point such as AP1 or AP2 each broadcasts a beacon signal frame from time to time in the form of a beacon MAC (L2) that provides information required by stations for establishing and maintaining an association with the AP. The beacon contains a unique identifier of the WLAN (and AP of the WLAN) called the Service Set Identifier (SSID). The beacon also contains other information such as information on the data rates supported by the AP.

Prior to associating with a WLAN, a station such as STA 111 may be placed in a mode called RF monitor mode during which the station listens to all MAC frame types (control, management and data) regardless of the AP from where the frames originate or belong to. The purpose of this mode is essentially to enable a wireless station to "scan" for broadcasts from APs, e.g., the broadcast of beacons, in order to locate an AP with a good enough signal strength with which to associate. This process of listening for-beacons is called "passive scanning" in the IEEE 802.11 standard.

In a normal IEEE 802.11 scan, the wireless network device of a wireless station provides the L2 information from all APs it can hear along with the signal strength to compare access points and decide upon which one to associate with. A wireless network device in RF monitor mode can receive from more than one AP, but cannot transmit information. Other IEEE 802.11 modes include send-receive mode, also called station mode.

Without benefit of this invention, a STA such as STA 111 in RF monitor mode will receive beacons from all APs it can hear, in this case from both AP1 and AP2. The STA will associate with the first AP whose signal strength is good enough. It may be that the signal strengths of beacons from AP2 are stronger than of beacons from AP1. In such a case, the station 111 will associate with the WLAN of AP2, and thus will not be in communication with the foreign agent 105, the access router 115, the home agent 107, or the server 117.

It is desired for the STA 111 to preferentially associate with a WLAN based not only on L2 information such as signal strength, but also additional information such as the radio link having good network performance metrics, e.g., a low latency, or such as knowledge that the AP is in communication with particular types of service, e.g., with a foreign agent, so that the station can be a mobile node under Mobile IP. Such information is not normally available to a station prior to the station associating with a WLAN.

While a network configuration such as shown in FIG. 1 is prior art, the configuration of FIG. 1 with the station and/or the access points including aspects of the present invention is not prior art.

Figure 3A:
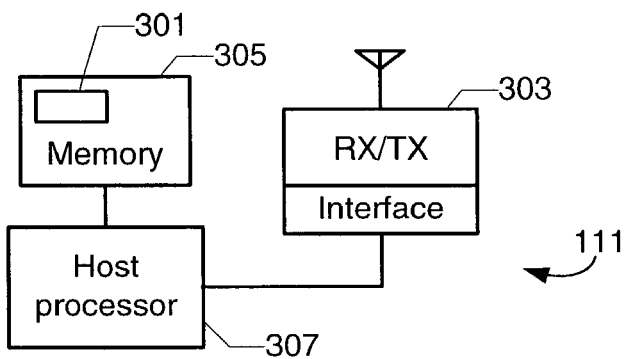
FIG. 3A shows a simplified block diagram of one wireless station embodiment.
Figure 3B:
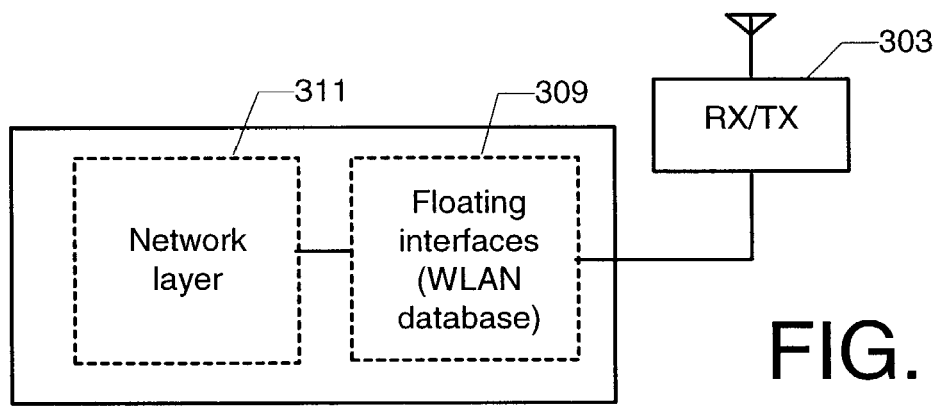
FIG. 3B shows the STA of FIG. 3A in more detail. In addition to a conventional protocol stack 311, STA includes in its memory a database called the "WLAN database." An aspect of the invention provides a set of floating interfaces between the protocol stack that sends to and receives IP packets and one or more wireless networks even though there may not be an association yet with the wireless networks.

FIG. 3A shows a simplified block diagram of one embodiment of wireless station 111 that includes a wireless network device 303 that includes a wireless transceiver and that provides and accepts IEEE 802.11 MAC frames to/from a protocol stack in a host processor 307. When the STA 111 is associated with an AP of a WLAN, the wireless network device 303 provides an (actual) bidirectional interface to the WLAN, i.e., a connection point to the AP at the STA 111. The processor 307 of the wireless includes a memory 305 that may include volatile and non-volatile memory. The embodiments of the processes described herein operate of the processor and use the memory. Some embodiments of the invention are in the form of a carrier medium carrying one or more computer readable code segments that instruct the processor to implement one or more of the processes, i.e., methods described herein. The carrier medium in one embodiment is in memory 305 and shown in FIG. 3A as the set of code segments 301. Those in the art will understand that the carrier medium may be provided in different forms, e.g., on magnetic or optical media. Thus, the carrier medium forms a software product.

Gathering Information Prior to Associating with an AP

One embodiment of the invention includes the wireless station 111, in a mode called RF monitor mode, screening all the frames the station can hear, examining the beacons that contain the AP's SSID, extracting from the PHY sublayer a measure of the signal strength, in one embodiment in the form of the RSSI (Received Signal Strength Indicator), and building a list of the available APs. In one embodiment, this screening is implemented as a module of the protocol stack operating for the wireless network device and in another embodiment by a user-level computer program. The program accesses and configures the protocol stack via a command line interface (CLI). For example, in one embodiment, the STA operates under a networked operating system. The networked operating system is the Cisco Internetworking Operating System (IOS®) (Cisco Systems, Inc., San Jose, Calif.), IOS provides a command line interface (CLI) for carrying out many network management functions.

The program or module operates mostly at L2. For example, in the case the process forms part of the L2 layer of the stack, the process reads L3 packets in the L2 frames, and can pass the L3 contents of MAC level broadcasts, such as IP IRDP packets used to advertise a foreign agent, to the L3 layer. One aspect of the invention includes the station sending probe packets to obtain one or more network performance statistics. For this aspect, the station temporarily associates with an AP prior to sending the probe packets then returns to RF monitor mode, i.e., unassociates.

Thus, one embodiment of the invention is a method for a station to identify and gather information about the APs that its wireless network device can hear on the WAN prior to association with any AP. In one embodiment, the information is available to any process at the station, e.g., L3 at the station. In one embodiment, the information includes IP mobility information, e.g., whether the AP is sending mobility agent advertisement. In one embodiment, the information further includes one or more network performance statistics. In one embodiment, the information is used to build a set of one or more floating interfaces to available WLANs, in the form of APs for association. An L3 process can then select from among the available APs using one or more criteria. For example, the L3 process can then select an AP that is in communication with one or more Mobility Agents or an AP that meets some network performance metric, e.g., a low enough latency, or a combination of criteria.

Figure 2A:
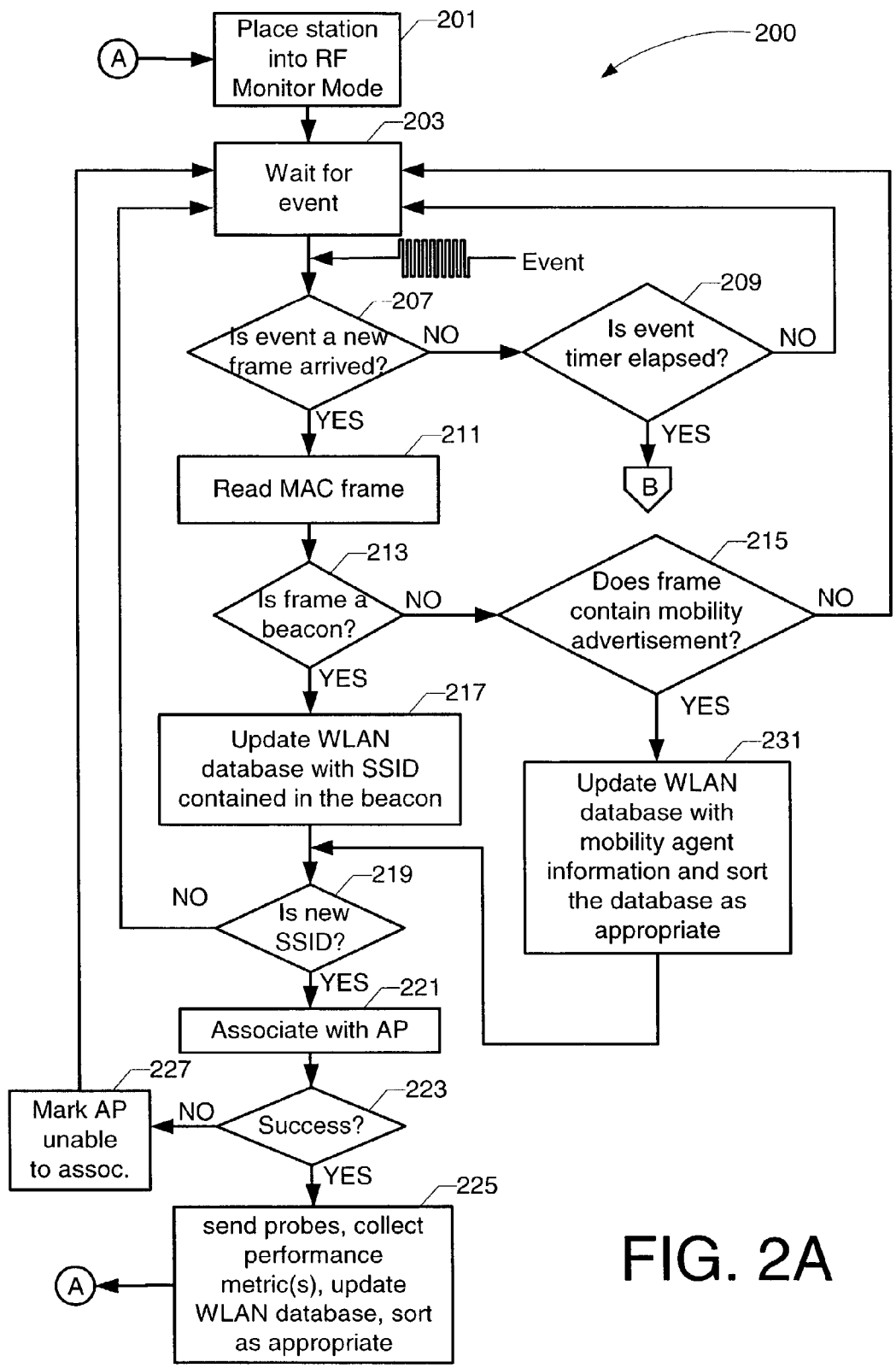
FIG. 2A shows a simplified flow chart of one aspect of the invention, according to which a station in monitor mode listens at L2 to all the L2 network traffic from all the APs in its radio range and builds a database containing L2 information, L3 information, and in one embodiment, one or more network performance metrics obtained using probe packets.

FIG. 2A shows a simplified flow chart of an L2 process 200 that in one embodiment operates on the processor 307. According to one aspect of the invention, process 200 includes the station listening in RF monitor mode to all the network traffic from all the APs in its radio range in order to gather AP information, including mobility agent information. The station is assumed not to be associated with an AP. In a step 201, if the station is not in monitor mode, a device-specific command from the program or module causes the station to place the wireless network device 303 into RF monitor mode. State 203 is a wait state waiting for an event such as arrival of a new link-layer (MAC) frame arriving at the wireless network device 303. In a step 207, it is ascertained if indeed the event is a MAC frame arriving. If not, and, in one embodiment, if an event timer has not expired (209), the process continues at the wait state 203 for an event to occur.

If the event is a new frame arriving, the new MAC frame arriving is read at L2 in a step 211.

Included in each MAC frame is additional information, for example the SSID of the WLAN, i.e., the identifier of the AP that originated the packet. Also provided, for example by the wireless network device as ancillary information, is an indication of the quality of the wireless signal at the time the MAC frame was received. The L2 frames may further have L3 information encapsulated, e.g., in the form of IP packets. For example, the IP packet may include a mobility agent advertisement such as a foreign agent advertisement or a home agent advertisement.

In one embodiment of the invention, information about the AP that transmitted the received L2 packet is stored as a record in a data structure stored in the memory 405 of the STA and called the "WLAN database" herein. The WLAN database 409 thus includes information on the APs that the STA hears in RF monitor mode. A STA hearing an AP means that the signal at the STA received from the AP is of a sufficient strength for the AP and STA to wirelessly communicate.

One embodiment of a WLAN database is shown diagrammatically in FIG. 5A as a table 501. Another table embodiment 511 is shown in FIG. 5B. Each record in the WLAN database (501 and 511) includes a set of fields on information about an AP from which an L2 frame was received. In one embodiment, the information in the record includes an identifier of the WLAN from which the frame was received in the form of the SSID (503, 513 in WLAN databases 501, 511, respectively). Each of WLAN databases 501 and 511 shown some number N of entries with SSIDs denoted as SSID-1, SSID-2, . . . , SSID-N. Each entry includes L2 information (505, 515 in WLAN databases 501, 511, respectively) such as the signal strength. As described in the parent invention, each entry can also include L3 information (507, 517 in WLAN databases 501, 511, respectively) that would not normally be available until after the station was associated with the AP. The L3 information includes information on mobility agents and/or access routers (ARs) and/or other service providers the WLAN is in communication with (see below). In one embodiment, such other service providers are IP-enabled. In one embodiment, each record of the WLAN database includes any IP packet(s) from the received L2 frame(s), and a time stamp of when each frame was received from the AP of the WLAN. In one embodiment, each record also includes an indication of any mobility information contained in any IP packet in the received L2 frame, e.g., of any mobility advertisement from a mobility agent.

The WLAN database embodiment 511 of FIG. 5B further includes for each entry one or more network performance metrics that are obtained by sending one or more probe packets (see below).

In one embodiment, each record in the WLAN database also includes a flag field that when set indicates that the record is the Most-Recently-Used-Association (MRUA) record. The MRUA always holds the record for the AP that was used for the most recent association or re-association. The MRUA record is never evicted from the WLAN database, for example to create space for more records.

In an alternate embodiment, the WLAN database includes a field that indicates the N-last associations with APs that wirelessly transmitted mobility information from different mobility agents.

The WLAN database is searchable and orderable by one or more fields, including the time stamp and one or more of the headers in the stored L2 frame.

Each record in the WLAN database thus provides a floating interface to the WLAN via one of the APs that the station can hear. Associated with each floating interface is the WLAN and the station's wireless network device that the interface can use to establish an actual interface to the WLAN. The floating interface can be provided to the network layer (L3) at the station as if it was an actual interface to a WLAN even though there may not be association to that WLAN.

In one embodiment, each record includes an indication of the state of the floating interface from the states shown in Table 1 below.

TABLE 1

| State | Description of State |
| --- | --- |
| Interface down | The AP of the WLAN is not found in the wireless medium |
| Interface up, protocol down | The AP of the WLAN is found but cannot be associated with. |
| Protocol up (mimicked) | The AP of the WLAN is found and is available for association. |
| Protocol up (real) | The WLAN is currently associated with the station. |

FIG. 4B shows a STA that includes, in addition to a conventional protocol stack, a WLAN database that provides a set of floating interfaces 409 of the WLANs that a wireless network device 403 can hear. The floating interfaces are provided to the network layer 411 of the protocol stack.

In one embodiment, the STA's memory 405 includes volatile memory and the WLAN database is located in the volatile memory, e.g., DRAM. In another embodiment, the STA's memory 405 includes non-volatile memory, e.g. SRAM, and the WLAN database is located in the non-volatile memory. In one embodiment, the WLAN database is accessible to other processes operating on the STA, or to other processes on other processors on the network.

One station embodiment includes more than one wireless device (or a device with several channels that can simultaneously provide interfaces to different WLANs) each capable of association with a WLAN, so each capable of providing an interface to a WLAN. In such an embodiment, each record in the WLAN database further includes an identifier of the wireless device that would provide the actual interface after association with the WLAN of the floating interface, and information on one or more capabilities of the actual interface to the WLAN, such as speed, one or more network performance metrics, and so forth.

In the embodiment corresponding to the flow chart of FIG. 2A, the WLAN database includes records, i.e., provides floating interfaces for the APs that the STA can hear whether or not the AP sends one or more L2 frames that include mobility agent information. In an alternate embodiment (not shown in FIG. 2A), the WLAN database includes records only for APs that the STA can hear and that have transmitted mobility agent information. In such an alternate embodiment, if it is ascertained in the peeking that the L2 frame does not contain an IP packet from a mobility agent, flow returns to 203 to accept another L2 frame.

Returning to FIG. 2A, in a step 213 it is ascertained whether or not the read MAC frame is a beacon. If it is a beacon, in a step 217, the WLAN database is updated. If there is no entry for the WLAN with the SSID contained in the beacon, a new entry is created. If an entry already exists, the entry is updated, for example, with the signal strength information.

In a step 219, it is ascertained if the entry is a new SSID. If not, the process returns to wait state 203 to wait for another event.

Without benefit of the present invention, the link layer prior to association of the STA, e.g., while in RF monitor mode would not concern itself with any encapsulated L3 information such as mobile IP information or with any actual network performance metrics.

In one aspect of the invention, the station temporarily associates with the AP of the WLAN and sends one or more probe packets in order to determine one or more network performance metrics.

Thus, if in step 219, it is ascertained that the beacon is from a new WLAN, in a step 221, the STA associates with the WLAN. A step 223 checks if indeed the association was successful. If not, then in a step 227, the floating interface to that WLAN is marked "Interface up, protocol down" to indicate that the AP of the WLAN cannot be associated with. The process then returns to wait state 213 to wait for another event.

If the station successfully associates with the AP of the WLAN, in a step 225, the station sends one or more probe packets to determine one or more network performance statistics. In one embodiment of the invention, the station operates under IOS (Cisco Systems, Inc., San Jose, Calif.). The one or more network performance metrics are obtained using the Cisco Service Assurance Agent (SAA) (Cisco Systems, Inc., San Jose, Calif.), formerly known as the Cisco Response Time Reporter (RTR). SAA is an application aware agent to that monitors network performance by measuring network performance metrics including one or more of response time, availability, jitter (interpacket delay variance), connect time, throughput, and packet loss. SAA obtains such metrics by sending one or more probe packets. In one embodiment, SAA operates under a networked operating system, such as the Cisco Internetworking Operating System (IOS®) (Cisco Systems, Inc., San Jose, Calif.). IOS provides a command line interface (CLI) for carrying out many network management functions. SAA includes support for Voice over IP (VoIP), quality of service (QoS), and the World Wide Web (WWW). SAA is available for all platforms that run IOS Release 12.0 (5)T or later. It can be used via the CLI when the Cisco Response Time Monitoring (RTTMON) MIB is available to a router. SAA is also accessible using SNMP.

Note that while the embodiments described herein use SAA, the invention does not depend on or require SAA or RTR. Other embodiments use other tools to send the one or more probe packets to one or more network performance metrics.

See below for descriptions of different network performance metrics that different embodiments of the invention collect.

Thus, in one embodiment, after the station temporarily associates with an AP in step 221, the station sends one or more probe packets via the AP. In one embodiment of the invention, the AP includes a probe responder that recognizes particular probe packets and replies on the radio link to the station that sent each probe packet, even though the AP may not yet be "properly" associated with the station, but only temporarily associated only for the purpose of the AP accepting probe packets. Note that normally, when an AP receives packets sourced by an associated mobile node, it forwards the packets as required. When the AP includes a probe responder, the AP responds to the recognized particular probe packets. In one embodiment, the probe responder is Cisco's SAA responder (Cisco Systems, Inc, San Jose, Calif.).

In one embodiment of the invention, the probe packets are targeted to a target IP address, e.g., the address of a foreign agent, an access router, or some other network node that communicates using IP and that provides some service, e.g., service X.

Step 225 thus collects one or more performance metrics, either to the AP, or to an IP-enabled service provider. For example, if it is known from the L3 information in the WLAN database that the AP is in communication with a foreign agent, the network performance metrics may be between the station and the foreign agent via the AP of the WLAN.

In one embodiment, the network performance metrics collected include one or more metrics between the station and a targeted IP-enabled service provider that are specific to the targeted service provider. In the case that the targeted service provider is a mobility agent, e.g., a foreign agent, the one or more metrics may include mobility agent-specific information such as the number of endpoints registered with the agent, the number of tunnels the mobility agent is supporting, and so forth.

Step 225 further includes updating the WLAN database with the performance metrics information. In one embodiment, the insertion of the performance metrics information includes ordering—e.g., sorting—the records according to one or more ordering criteria. In one embodiment, the purpose of ordering is to provide the information to L3 in a desired order so that L3 automatically selects a floating interface for association according to one or more selection criteria. In such a case, the ordering criteria map to the selection criteria. In one embodiment, the ordering criteria (and/or interface selection criteria) include ordering (and/or selecting) according to one or more application-related requirements. For example, an application may have a set of SSIDs that it prefers for one or more reasons such as: security characteristics of the WLANs, quality of service each WLAN provides, cost of access, and so forth.

In one embodiment, the ordering criteria (and/or interface selection criteria) include ordering (and/or selecting) according to one or more quality of service parameters, such as required quality of service. The quality of service requirements in turn may be related to one or more of the collected network performance metrics.

One aspect of the invention is that the ordering criteria (and/or interface selection criteria) include L3 information such as what mobility agent information is included. In an embodiment that further includes more than one wireless device, the ordering criteria (and/or interface selection criteria) include the capabilities of the physical interface to the WLAN, such as speed, network performance metrics, and so forth).

Thus, in one embodiment, records that include a mobility agent advertisement are given priority. In one embodiment, the ordering criteria include ordering according to one or more network performance metrics. One embodiment orders according to a combination of more than one ordering criteria, such as giving priority to those records that include mobility agent information, and further ordering such prioritized, i.e., mobility-agent-related records according to one or more network performance metrics.

One embodiment of step 225 of updating the WLAN database includes discarding those records not meeting one or more acceptance criteria. In one embodiment, the acceptance criteria include one or more network performance metrics meeting or exceeding a pre-defined level of quality. In another embodiment, in which the mobility agent is a foreign agent, the acceptance criteria include only accepting IP packets that are of foreign agent advertisements that indicate that the foreign agent is not "busy", i.e., that the foreign agent is accepting registrations.

If at step 213, it is ascertained that the MAC frame is not a beacon, then in a step 215, the process peaks inside the MAC frame to ascertain whether or not the MAC includes a mobility agent advertisement. If not, the process returns to wait state 203 to wait for another event such as a new MAC frame arriving at the station 111.

Once it is ascertained that a received MAC frame contains mobility agent information, the WLAN database is updated with this information (step 231). In one embodiment, the insertion of the new L3 information in step 231 includes ordering—e.g., sorting—the records according to one or more ordering criteria. In one embodiment, the purpose of ordering is to present the information to L3 in a desired order so that L3 automatically selects a floating interface for association according to one or more selection criteria. In such a case, the ordering criteria map to the selection criteria. In one embodiment, the ordering criteria (and/or interface selection criteria) include ordering (and/or selecting) according to one or more application-related requirements. For example, an application may have a set of SSIDs that it prefers for one or more reasons such as: security characteristics of the WLANs, quality of service each WLAN provides, cost of access, and so forth.

In one embodiment, the ordering criteria (and/or interface selection criteria) include ordering (and/or selecting) according to one or more quality of service parameters, such as required quality of service. One aspect of the invention is that the ordering criteria (and/or interface selection criteria) include L3 information such as what mobility agent information is included. In an embodiment that further includes more than one wireless device, the ordering criteria (and/or interface selection criteria) include the capabilities of the physical interface to the WLAN, such as speed, one or more performance metrics, and so forth).

Thus, in one embodiment, records that include a mobility agent advertisement are given priority. In one embodiment, the ordering criteria include ordering according to collected network performance metrics, and if none are available, to received signal quality. One embodiment orders according to a combination of more than one ordering criteria, such as giving priority to those records that include mobility agent information, and further ordering such prioritized, i.e., mobility-agent-related records according to one or more collected network performance metrics.

One embodiment of step 231 of updating the WLAN database includes discarding those records not meeting one or more acceptance criteria. In one embodiment, the acceptance criteria include the collected performance metrics meeting or exceeding a pre-defined level of quality. In another embodiment, in which the mobility agent is a foreign agent, the acceptance criteria include only accepting IP packets that are of foreign agent advertisements that indicate that the foreign agent is not "busy", i.e., that the foreign agent is accepting registrations.

After the updating with any found mobility agent information in step 231, the process continues with step 219 of ascertaining whether or not the MAC frame is from a new SSID. If yes, the station temporarily associates with the AP to send one or more probe packets to collect one or more network performance metrics. If not a new SSID, the process returns to wait state 203.

If in step 207, it is ascertained that the event is not a new frame arrived, in a step 209 it is ascertained if an event timer has not expired. If not, the process continues at the wait state 203 for an event to occur. If the event timer has expired, in one embodiment, the process stops. In another embodiment described below with the aid of FIG. 2B, the WLAN database is updated.

The process of FIG. 2A thus provides a WLAN database of available WLANs that includes L2 and L3 information. This information is available at any time to another process, e.g., L3.

In one embodiment, the process of FIG. 2A occurs from time to time so that the information in the WLAN database is up-to-date. In one embodiment, the process is repeated periodically. That is, the WLAN database is updated from time to time by placing the station into RF monitor mode and updating the information in the WLAN database with new MAC frames. The process of FIG. 2A thus provides a WLAN database of available WLANs that includes L2 and L3 information. Any process (e.g. L3) at the station can obtain information from the WLAN database at any time.

Figure 2B:
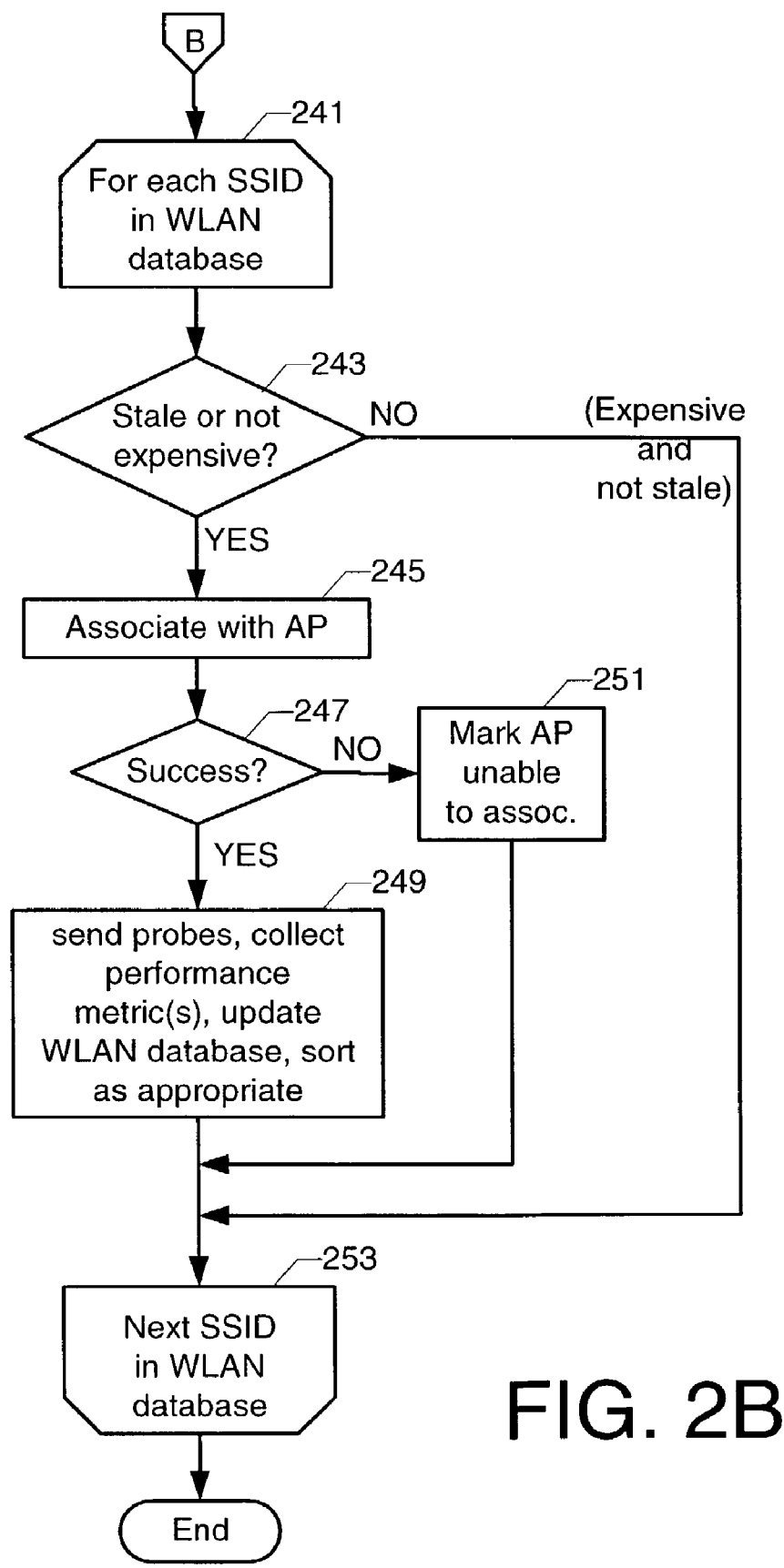
FIG. 2B shows one embodiment of a process of updating the WLAN database including sending probe packets to obtain one or more network performance metrics for stale or "inexpensive" database entries.

FIG. 2B is a flow chart of one embodiment of updating the WLAN database entries with one or more updated network performance metrics. In one embodiment, the process of FIG. 2B occurs in the case that it is ascertained in step 209 that the timer has expired. In another embodiment, the metrics updating occurs periodically.

The updating occurs in a loop (241 to 253) for each SSID in the WLAN database 511. The updating includes a step 245 of temporarily associating with the AP of the WLAN. A step 247 checks if indeed the association was successful. If not, then in a step 251, the floating interface to that WLAN is marked "Interface up, protocol down" to indicate that the AP of the WLAN cannot be associated with.

If the station successfully associates with the AP of the WLAN, in a step 249, the station sends one or more probe packets to determine one or more network performance statistics with which to update the WLAN database entry. The updating, in one embodiment, includes ordering according to one or more ordering criteria (see above).

In one embodiment, the WLAN database entries includes a timestamp of when the entry was last updated. If the difference between the present time and the timestamp is above a settable "staleness" threshold, the entry is regarded as "stale." In one embodiment, the updating of an entry is attempted only if the entry is stale.

Obtaining the one or more network performance metrics may be "expensive" in terms of computational complexity and/or the time required to send the probe packets, obtain the responses, and compute the metric. By expensive is meant that the computational complexity and/or the time required to complete the metric collection exceeds a settable "expense" threshold. In one embodiment, the updating of an entry is attempted only if such updating is not expensive.

In another embodiment, shown in FIG. 2B, the updating of an entry is attempted only if the entry is stale and not expensive as ascertained in a step 243.

While in one embodiment, the WLAN database 511 stores the performance metrics collected for each entry in the WLAN database, in another embodiment, the collected network performance metrics are also stored in each AP that has the capability of storing such network performance metrics. Thus, each AP may be enhanced compared to a prior art access point by including one or more network performance metrics in the AP. Such performance metrics may include network performance metrics between the AP and a station that may associate with the AP, and network performance metrics between the AP and one or more IP-enabled service providers that the AP is in communication with, such one or more mobility agents.

In another embodiment, the collected network performance metrics are stored in each AP that has the capability of storing such network performance metrics, and not at the station.

Gathering the Performance Metrics

One embodiment uses the Cisco Service Assurance Agent (SAA) to send the one or more probe packets and collect the one or more performance metrics. SAA operates under Cisco's IOS and monitor network performance between a router, e.g., the STA acting as a mobile router and a remote device that may be another router, an IP host such as a the AP or an IP-enabled service provider, such as a mobility agent.

The one or more performance metrics include one or more of UDP response time, UDP one-way delay, UDP jitter, i.e., UDP interpacket delay variance, hop-by-hop ICMP response time, hop-by-hop ICMP jitter, packet loss statistics, Data Link Switching peer tunnel performance, or one or more Website performance metrics such as DNS lookup, TCP connect and HTTP transaction time.

Details of the operation of SAA and of the above-listed performance metrics can be found in the document: "Cisco Service Assurance Agent User Guide," available from Cisco Systems, Inc., San Jose, Calif., including on the Web at http://www.cisco.com/warp/public/cc/_pd/iosw/prodlit/saaug_ai.htm, and for download on the Web at http://www.cisco.com/warp/public/cc/pd/iosw/prodlit/saaug_ai.pdf. The documents "Cisco Service Assurance Agent User Guide" is incorporated herein by reference.

SAA provides the ability to define rising and falling thresholds to monitor Service Level Agreements (SLAs) so that quality of service QoS may be maintained.

Some embodiments of the invention use SAA Responder, a component embedded in the target router, e.g., an access router, whose functionality is to respond to SAA request packets. It can respond to multiple SAA operations simultaneously. SAA can specify the port number on which the responder listens to the SAA packets.

Because routers sometimes take tens of milliseconds to process incoming SAA packets, due for example, to other high priority processes, SAA time-stamps the one or more probe packets used SAA operations.

In one embodiment, the performance metrics collection operation, e.g., part of step 225, uses SAA's Internet Control Message Protocol (ICMP) Echo Operation to measures end-to-end response time between a router, e.g., the STA acting as a router—eventually a mobile router—and any IP-enabled device, e.g., the AP, a mobility agent, or some other IP-enabled device. Response time is computed by measuring the time taken between sending an ICMP echo request message to the destination and receiving an ICMP echo reply. SAA provides an option to compute response time on a specific path with LSR option in IP packet. SAA also allows a user to measure Quality of Service (QoS) between endpoints by setting DSCP bits on an IP packet.

In one embodiment, the performance metrics collection operation uses SAA's ICMP Path Echo operation to compute hop-by-hop response time between the STA acting as a router and any IP device on the network. SAA discovers the path using traceroute and then measures response time between the STA and each intermittent hop in the path. If there are multiple equal-cost routes between source and destination devices, pathEcho operation has the capability to identify a specific path by using LSR option (if enabled on intermediate devices). This feature enables SAA to discover paths more accurately, as compared to a typical traceroute.

In one embodiment, the performance metrics collection operation uses SAA's User Datagram Protocol (UDP) Operation to calculate UDP response times between the STA acting as a router and any IP-enabled device. Response time is computed by measuring the time taken to send a datagram (an L3 packet) and receive a response from the destination device. If the target is a router that can include an SAA responder, in one embodiment, the SAA responder in the target router may be enabled. The responder would either listen to the default UDP echo port (port 7), or to the port that the user can specify. Using SAA responder can increase accuracy as the process delay in the target router is assessed.

In one embodiment, the performance metrics collection operation uses SAA's Transmission Control Protocol (TCP) Connect Operation to compute response times by measuring the time taken by the STA to perform a TCP connect operation to the destination device. If the target is a router that includes an SAA responder, the SAA responder in the target router may be enabled. If the destination is a non-Cisco IP host, then the user must specify a well-known port number. Some well-known ports are: 21 (ftp), 23 (telnet), 80 (HTTP Server). This operation is useful in simulating Telnet or HTTP connection times.

Some embodiments include a STA that supports real-time traffic such as Voice traffic over IP (VoIP). For real time traffic, the delays involved in transmitting data become important. In one embodiment, the performance metrics collection operation, e.g., part of step 225, uses SAA's UDP Jitter operation that measures the delay, delay variance, and packet loss in IP networks by generating synthetic UDP traffic. The UDP Jitter operation sends a settable number of packets, each of a settable size, from the STA acting as a router to a target router (which is SAA responder enabled) each some settable time apart. The UDP Jitter operation is capable of measuring one or more of the per-direction inter-packet delay variance (jitter), the per-direction packet-loss, and the average round trip time.

In one embodiment, the performance metrics collection operation, e.g., part of step 225, uses SAA's Domain Name System (DNS) operation that computed the DNS response time calculating the difference between the time taken to send a DNS request and the time a reply is received. The SAA DNS operation queries for an IP address if the user specifies hostname, or queries for a hostname if the user specifies an IP address.

In one embodiment, the performance metrics collection operation, e.g., part of step 225, uses SAA's HTTP Operation that measures the Round Trip Time (RTT) taken to connect and access data from a HTTP server. The HTTP server response time measurement is split into three different steps: RTT taken to perform domain name lookup, RTT taken to perform a TCP connect to the HTTP Server, and RTT taken to send a request and get a response back from the HTTP Server.

In one embodiment, the performance metrics collection operation, e.g., part of step 225, uses SAA's Dynamic Host Configuration Protocol (DHCP) Operation that measures the round trip time taken to discover a DHCP Server and obtain a lease from it. SAA releases the leased IP address after the operation.

In one embodiment, the performance metrics collection operation, e.g., part of step 225, uses SAA's Data Link Switching (DLSw) Operation. Data Link Switching Plus (DLSw+) (Cisco Systems, Inc., San Jose, Calif.) is an enhanced version of RFC1795. DLSw+ tunnels Systems Network Architecture (SNA) traffic over IP backbones via TCP. The routers performing the tunneling of SNA traffic into TCP/IP are referred to as DLSw peers. SAA's DLSw+ operation measures the DLSw+ protocol stack and network response time between DLSw peers. DLSw peers normally communicate through TCP port 2065.

In one embodiment, the performance metrics collection operation, e.g., part of step 225, uses SAA's File Transfer Protocol (FTP) Get Operation whose is to measure the time it takes to transfer a file from a remote host to the STA acting as a router. This operation will be very useful in characterizing the capacity of a network. SAA's File Transfer Protocol (FTP) operation carries a significant amount of traffic.

In one embodiment, the performance metrics collection operation, e.g., part of step 225, uses SAA's Path Jitter Operation that facilitates the measurement of jitter, packet loss and delay at each hop in an IP network. The operation first discovers the IP route from the source to the destination via traceroute and then uses ICMP echoes to arrive at the response times, packet loss and "approximate" jitter values (based on RFC1889) for each hop along the path. The measurements would be approximates since ICMP only yields round trip times.

Interface Selection

The floating interfaces in one embodiment behave as real interfaces. This includes the interfaces being included in one or more routing tables. In general, an interface (floating or not) appears in a routing table at the station when it is in state "up." In one aspect of the invention, this includes floating interfaces that are in the "protocol up (mimicked)" state.

Thus, in one embodiment, the L2 module or process that, for any reason, puts the interface in state "up," also adds the interface to the routing table associated with the L2 link the interface is attached to.

Another aspect of this invention is selecting an interface from the set of floating interfaces in the WLAN database. One embodiment includes a method of selecting an interface based on one or more selection criteria.

In one embodiment, the interface selection criteria include selecting according to one or more application-related requirements. In one embodiment, the interface selection criteria include selecting according to one or more quality of service parameters, such as required required network performance metrics. In one embodiment, the interface selection criteria include L3 information such as whether and what mobility agent information is included. When the station is capable of having more than one physical interface to more than one WLAN, the selection criteria include the capabilities of the physical interface to the WLAN, such as speed, network performance metrics, and so forth. The selection is preferably made according to a combination of criteria.

To actually select an interface from the set of floating interfaces, an L3 process sends IP data to the selected floating interface. In one embodiment, the process is the L3 of the protocol stack. The selected floating interface is assumed to be in "protocol up (mimicked)" state. Sending data to such a protocol causes the wireless device to go from RF monitor (scan) mode into station mode and associate with the corresponding SSID of the selected floating interface.

If there are no free physical wireless devices available that can hear the AP of the selected SSID WLAN, one embodiment includes dropping an existing association. The process then modifies the record of the AP database by changing the interface state to "protocol up (real)" and further changed updates the MRUA flags.

The associating in one embodiment occurs immediately, or in another embodiment, only when there are packets to send on that interface.

Automatic selection

In one embodiment, selected IP packets, e.g., those containing a router advertisement message of type foreign agent in the record of the WLAN database are made available from L2 to L3 according to an order. This mimics an L2/L3 interface providing the network layer with IP packets, even though there is no communication from the network level of another entity. In such an embodiment, the records are first ordered in step 219 according to one or more ordering criteria (see above). The L3 packets are presented to L3 in the order so that L3 automatically selects a floating interface for association according to one or more selection criteria. That is, in the embodiment that preferentially provides IP packets with mobility agent advertisements, the network layer receives the IP packets with the mobility agent advertisements even though the STA is not yet part of a WLAN, i.e., associated, and not yet in bi-directional communication with the mobility agent.

One application of such automatic selection is operating the station as a wireless mobile router. The station is also a router configured to provide mobile router services and includes a wireless device to provide a physical interface to a WLAN, and dedicated to connect to mobility agents that are foreign agents or access routers that transmit mobility advertisements. The process described above provides a WLAN database of floating interfaces. In the case of implementing a mobile router, WLAN database records are each floating interfaces to WLANs that receive mobility information from foreign agents or IPv6 access routers. The wireless network device 303 stays in RF monitor mode until the mobile IP opens a floating interface by sending an IP packet to a mobility agent such as a foreign agent in order to register to the mobility agent.

In one embodiment, the station may "lock" an association in a floating interface that is in the protocol up (real) state so that L2 may not de-associate the floating interface as might occur when there is a request to associate with a different WLAN. The locking of floating interfaces is used, for example, when implementing a mobile router. Once a mobile router completes registration with a foreign agent or access router, it can lock the floating interface.

Figure 6:
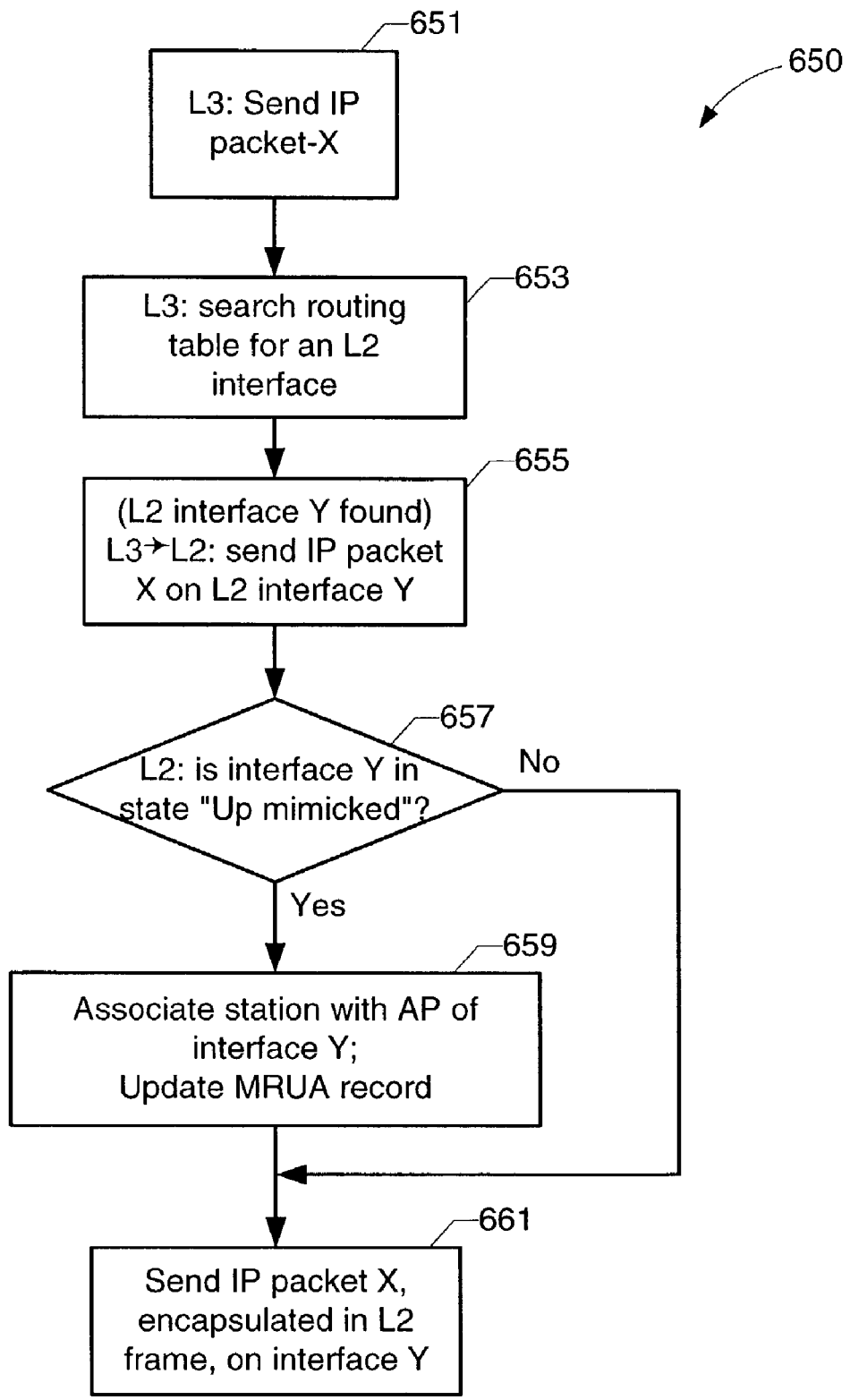
FIG. 6 shows a simplified flow chart of one embodiment of a process of associating with an interface that may be a floating interface provided in the WLAN database according to one embodiment of the invention.

FIG. 6 is a flow chart of one embodiment of a process 650 of sending an IP packet, optionally going through association with an AP if the interface selected in the process is a floating interface in the "protocol up (mimicked)" state. Thus, process 650 includes for example associating with one of the APs in the WLAN database as a result of the network layer of the STA sending an IP packet to one of the mobility agents connected to the APs of the WLAN records in the WLAN database.

In a step 651, L3 selects to send an IP packet ("Packet X"). In a step 653, L3 searches the station's routing table for a suitable L2 interface on which to send the IP packet. According to one aspect of the invention, the routing table includes information about the floating interfaces from the WLAN database. Step 655 assumes that a suitable L2 interface ("Interface Y") is found. In a step 655, the IP packet X is sent from L3 to L2 on the L2 interface Y.

Upon receipt of an IP packet X from the network layer, in a step 657, the link layer examines the state of the selected Interface Y to ascertain whether or not it is in the state "protocol up (mimicked)." If yes, at a step 659, the STA associates with the AP identified by the SSID of its WLAN of interface Y. Step 659 further includes updating the WLAN database to mark the record of interface Y as the MRUA record. The associating of the STA takes the STA from RF monitor mode to STA mode. Once associated, the link layer passes (step 661) the just-received IP packet X, encapsulated in an L2 frame, on interface Y so that it can be communicated via the just associated AP to the foreign agent. This, for example, may be to register with the mobility agent.

At this point, the station is associated with an AP that is in communication with one or more mobility agents. If IPv4 is in use, the mobility agent is a foreign agent or a home agent. If IPv6 is in use, the mobility agent is an access router or a home agent.

If in step 657 it is ascertained that the interface Y is not in "protocol up (mimicked)" state, it is assumed to be in "protocol up (real)" and the process continues with step 661 of sending the IP packet X, encapsulated in an L2 frame, on interface Y.

In one embodiment, the station may "lock" an association in a floating interface that is in the protocol up (real) state so that L2 may not de-associate the floating interface as might occur when there is a request to associate with a different WLAN. The locking of floating interfaces is used, for example, when implementing a mobile router. Once a mobile router completes registration with a foreign agent or access router, it can lock the floating interface.

Re-Association

One embodiment of the present invention is a method for a station that is associated with a first WLAN to be re-associated with a second (possibly the same) WLAN. In the case that the AP of the first WLAN is in communication with a first mobility agent, the re-association is such that the station preferably retains communication with the first mobility agent.

Re-association is triggered by a variety of events. These events include, but are not limited to the wireless signal quality becomes unacceptable, physical impairment of the wireless signal, one or more of the gathered network performance metrics falling below a settable threshold, and failure of the AP with which the station is associated the signal quality may degrade because the station physically moves to another location or because of some other degradation in the air interface. The physical impairment of the wireless signal may be by a person or object.

The re-association process described herein also occurs when, in the case that the station includes more than one wireless network device, connection to the WLAN is swapped automatically from the present wireless network device to another one of the wireless network devices. This might happen, for example, when there is a need for the station to associate with a particular WLAN that only the present wireless network device can hear.

When re-association is triggered, the floating interface to that associated WLAN changes state from "protocol up (real)" to "protocol down."

Figure 7:
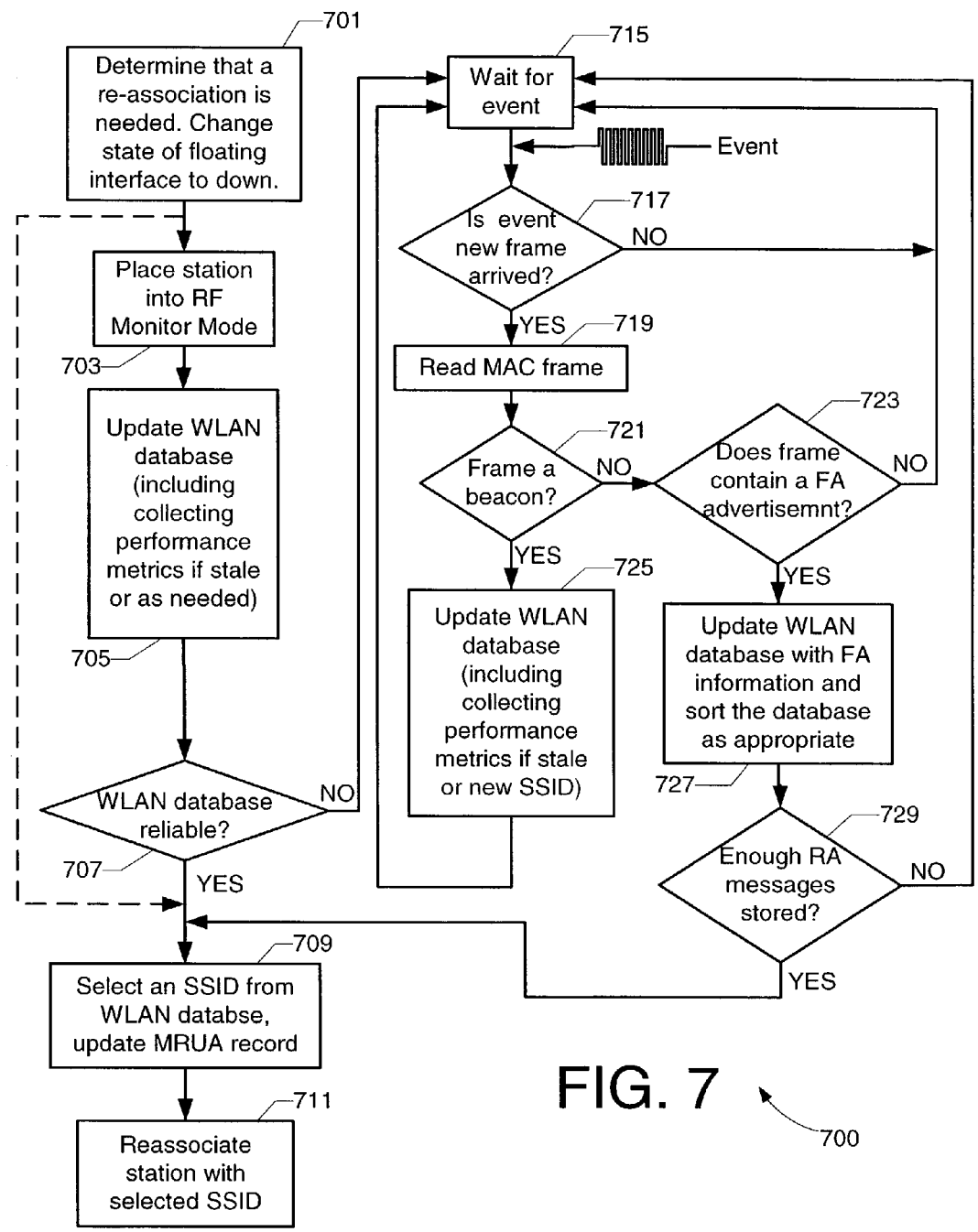
FIG. 7 shows a simplified flow chart of one embodiment of a process of re-associating.

FIG. 7 shows a flow chart of one embodiment of a re-association process 700.

Simple Re-Association and Re-Association with WLAN Database Upgrade

For any of the above reasons e.g., loss of AP signal or unacceptable signal quality degradation, or one or more of the performance metrics becoming unacceptable, in a step 701, the station's link layer may determine that a re-association is required. In such a case, the state of the floating interface is modified to down. As explained earlier, without benefit of the present invention, the station may re-associate with the first available AP with suitable signal quality. In the following, it is assumed that the AP of the associated WLAN is able to communicate with one or more mobility agents as determined, for example, by the AP periodically sending a mobility agent advertisement from a mobility agent.

In one embodiment of the invention, once the state of the floating interface is changed to down, the process continues in step 709 (see below) where a WLAN, i.e., an SSID, is selected for re-association.

In another embodiment, prior to the attempt at re-association, the WLAN database is first updated. In some embodiment, this also even when there is no signal degradation or other reason for re-associating, but rather in order to ensure that the information in the WLAN database on the floating interfaces is up-to-date.

One embodiment of updating is the process shown in FIG. 2B in which the one or more network performance metrics are updated.

Another embodiment of updating the WLAN database includes placing the station's wireless transceiver into RF monitor mode and carrying out a process similar to that shown in FIG. 2A and described below. In RF monitor mode, the station listens to all wireless traffic from all APs it can hear. As noted earlier, such monitoring is not possible when the station is associated with an actual AP.

In a step 705, the WLAN database is updated to ensure that each record is reliable according to one or more reliability criteria. Step 705 includes updating the state of each record, i.e., each floating interface in the WLAN database. In one embodiment, one criterion for a record in the WLAN database to be reliable is that the record's AP can still be reliably communicated with on the wireless medium. One embodiment of step 705 includes the station monitoring AP beacon signals from the APs in the WLAN database, making certain that every AP in the WLAN database still exists. Records other than the MRUA are purged in step 705 if no beacon signal of a sufficiently high signal quality is detected for that record's SSID. In one embodiment, the updating includes collecting one or more network performance metrics and purging records for which one or more network performance metrics are unacceptable. The MRUA record is kept because it contains information about the first mobility agent, i.e., an agent the AP was able to communicate with. As APs typically transmit a beacon relatively frequently, the time required to purge one or more records from the WLAN database is small compared to the time that would be required to rebuild the WLAN database.

In one embodiment, step 705 further includes checking the timestamp of each WLAN database record and discarding stale records, i.e., records of more than a pre-defined age, other than the MRUA record.

In a step 707, the overall reliability of the database is checked. In one embodiment, the reliability is a function of the number of records that still contain reliable information and that include the mobility agent information. In another embodiment, the database is judged reliable if it still contains a reliable MRUA record.

If the WLAN database is judged reliable, the process 700 continues in a step 709 (see below). If on the other hand, the WLAN database is judged unreliable, the database is built up by adding reliable records starting a wait state 715 wherein the station waits, in RF monitor mode, for an event. The process of building up the database is essentially the same as illustrated in the flowchart of FIG. 2A. In one embodiment, an extra check is made to ensure that there are enough records in the WLAN database that include mobility information, e.g., router advertisement messages. Thus, starting from the wait state 715, when an event occurs, a step 717 ascertains that the event is a new MAC frame arriving. If not, the process returns to the wait state. In one embodiment (not shown in FIG. 7), a timer is also checked to ensure it has not elapsed. When a new MAC frame arrives, it is read in a step 719. The frame is checked to ascertain if it a beacon, and if yes, the WLAN database is updated with information such as the signal quality, and the process returns to the wait state 715. If the MAC frame is not a beacon, a step 723 parses the frame and ascertains whether it contains mobility information, e.g., a foreign agent advertisement. If not the process returns to the wait state 715.

If the frame is ascertained to contain mobility information, the WLAN database is updated with the information, e.g., the foreign agent information. In one embodiment, the database updating step of process 727 further includes ordering the records according to one or more ordering criteria. This step is similar to the ordering described above described above. In one embodiment, the ordering criteria include ordering according to what mobility agent information is included.

In one embodiment, a check is made in a step 729 to ascertain whether or not there are enough appropriate messages stored in the WLAN database. In one embodiment of the invention, the number required for sufficiency is variable, derived dynamically on history. In another, the number required for sufficiency is based upon a prior knowledge of the number of mobility agents on the network. In another embodiment of the invention, a sufficient number is one record that includes an L2 frame encapsulating L3 mobility information. In yet another embodiment the number is greater than one. If it is ascertained that an insufficient amount of mobility agent information is included in the WLAN database, the process continues with the wait state 715 of waiting for another L2 frame.

Once it is ascertained that the WLAN database is reliable, or once the database has been sufficiently rebuilt, it contains at least the MRUA record.

In step 709, a WLAN, i.e., an SSID is selected for re-association according to one or more re-association criteria. Recall that the MRUA record contains information about the association that existed before it was determined that re-association was needed. In one embodiment, the re-association criteria include that the selected wireless network, i.e., selected SSID, is in communication with the foreign agent that sent the router advertisement message contained in the router advertisement message portion of the MRUA record. In one embodiment, step 709 includes searching the (non-MRUA) records of the WLAN database for one or more records whose foreign agent IP addresses matches the address of the mobility agent contained in the IP packet portion of the MRUA record. In one embodiment, the re-association criteria further include the received wireless signal quality. Thus, if more than one match is found, the SSID with the highest received wireless signal quality is selected for re-association.

If no matching IP addresses are found in step 709 other than the MRUA record itself, in one embodiment, step 709 includes searching the WLAN database for alternative mobility agents of the same kind, e.g., another foreign agent or another home agent. If records for more than one alternative mobility agent are found, step 709 includes selecting the mobility agent with the highest wireless signal quality. In one embodiment, if no re-association is possible, the process returns to RF monitor mode (step 703) again.

In a step 711, the STA re-associates with the selected AP. This step includes updating the MRUA record as required and updating the interface state field from protocol up (mimicked) to protocol up (real).

Thus, at completion, the station is re-associated with a WLAN whose AP is in communication with the mobility agent from the most recent association. If no such AP exists, the station is re-associated with an AP in communication with a different, but suitable mobility agent.

In one embodiment, e.g., when the station is a mobile router, the re-association process signals to the L3 processes in the station that a re-association has occurred. If L3 at the mobile router is registered with a foreign agent or access router via the WLAN of the floating interface that has re-associated, an L3 process in the station polls the foreign agent or access router in order to assert its registration station. In one embodiment, the station attempts at L3 to register with the foreign agent or access router. Once registration is successful or re-asserted, the mobile router causes the association with the WLAN to be locked on the wireless network device.

In one embodiment, if a WLAN, i.e., the AP of the WAN that is present in the air can no more be associated with, due to locked floating interfaces, the process providing the floating interfaces sets the matching floating interface to "protocol down." Once an interface is freed up that allows the association to that SSID (even if swapping is required), it is set back to "protocol up (mimicked)."

Alternate Embodiments with N-MRUA Entries in the WLAN Database.

In an alternate embodiment, the WLAN database includes a field that indicates the N-last associations with APs that wirelessly transmitted mobility information from N different mobility agents. The processes described above of building the WLAN databases and of re-associating the STA with an AP are modified. For example, the re-association process 600 can by modified to re-associate with a maximum number of the last N associations. One embodiment includes placing a time limit once a sufficient number of candidates for association is found. In one embodiment, N=4 and the sufficient number is 1 if the STA is not itself a mobility agent, and one of each kind in the case that the STA was both acting as a mobility agent and also itself a mobile node.

Stations Having Multiple Wireless Network Devices

Some station embodiments include more than one wireless network device. Each wireless network device can only associate with one WLAN at a given point in time. In one such embodiment, each wireless network device can go into its own RF monitor mode. Thus, the flow chart of FIGS. 2A and 6 includes each device monitoring for beacons it can hear. This is used, for example, if it is possible albeit unlikely that two wireless devices can hear non-identical sets of APs. Note that by multiple wireless devices is meant that the stations can have multiple interfaces to WLANs active at the same time. It may be that one physical device provides the plurality of interfaces, and the term multiple wireless network devices includes the case of the station having one such multiple-interface device.

Expedited Re-Association Using Two Wireless Devices

In a station with a single wireless network device, the time to collect L3 information, e.g., to locate mobility agents is unpredictable, and depends upon configuration of the routers that act as mobility agents. Furthermore, the time to collect performance metrics may be unpredictable. The time between mobility agent advertisements can be relatively long. This is especially true on high traffic networks, where broadcast and multicast traffic may be restricted, e.g., by network administrators. Moreover, in critical applications where re-association needs to happen rapidly, such as on a mobile network where the access router is itself a wireless station, slow re-association results in loss of connectivity to every node on the network. It is therefore desirable to have a relatively fast re-association process.

In the above described association (see FIGS. 2A and 6) and re-association embodiments (see FIG. 7), the speed of association or re-association may be dominated by the time spent in RF monitor mode collecting L2 and L3 information, and the time to temporarily associate to collect one or more performance metrics.

In another embodiment of the invention, the STA includes a second wireless network device dedicated to listening to APs in RF monitor mode and to collecting the network performance metrics. The listening building up and updating the WLAN database. The WLAN database is shared. In one embodiment, the second wireless network device is used for a floating interface because its mode does not change to station mode and it only temporarily associates with a WLAN and only for the purpose of collecting the network performance metrics.

Figure 4:
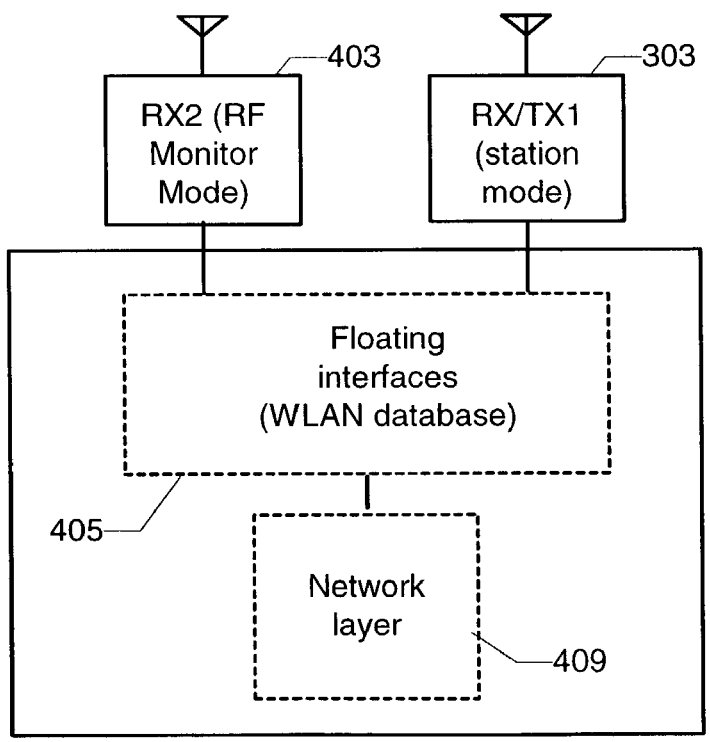
FIG. 4 shows a STA that includes a first wireless network device and a wireless network device in RF monitor mode such that the STA can re-associate relatively quickly according to one aspect of the invention.

FIG. 4 shows one such alternate station embodiment. The STA includes a first wireless network device 303 providing WLAN services and a second wireless network device 403. In one embodiment, the second wireless network device does not include a transmitter, i.e., is a receive-only device, while in another embodiment, the second wireless network device uses the receiver portion of an included transceiver.

Once an initial association of the STA with an AP has occurred, the first wireless network device 303 provides an actual interface to the WLAN of the AP, while the second wireless network device 403 monitors network traffic in RF monitor mode. The two wireless network devices are coupled to the network layer 411 of a protocol stack included in the STA via a set of floating interfaces 405 that use a WLAN database stored in memory. The monitoring of the AP traffic by the second wireless network device 403 adds information to the WLAN database 409, including adding mobility agent information, as described above and one or more network performance metrics. The initial association includes sending an IP packet to the network layer via the floating interfaces 405 so that the network layer can preferentially "respond" to a mobility agent, even when there is no actual communication yet between the STA and the mobility agent. The response is intercepted by a selected floating interface in protocol up (mimicked) state, causing the STA to associate—using the first wireless network device 303—with the AP from which the mobility agent information was transmitted. After that, communication may proceed via the first wireless network device 403. The second wireless network device continues monitoring in RF monitor mode and updating the WLAN database. When re-association becomes necessary, the set of floating interfaces provide the WLAN database record for the AP that is the best candidate for re-association.

Thus, referring to FIG. 2A, in one embodiment for the STA that has two wireless network devices, the process 200 of initial building of the WLAN database may use data received at the first or the second wireless network device. Step 201 is not necessary when the second wireless network device is always in RF monitor mode. At step 203, the process accepts a MAC frame from the second wireless network device.

Referring to FIG. 6, in one embodiment for the STA that has two wireless devices one of which is in RF monitor mode, the process 650 of associating associates the STA with the selected WLAN (i.e., an AP) in step 659 using the first wireless network device. Step 661 passes the IP packet to the MAC layer also using the first wireless network device.

Use of an Embodiment of the Invention to Implement a Mobile Router

One use of an embodiment of the invention is implementing a mobile router by integrating a WLAN directly into a STA that is also a router using the floating interfaces described herein. When a mobile router roams into a region where several WLAN are available, the Mobile Router needs to select the one that fits its requirements better, based on configured rules and dynamic availability of resources, signal strength, channel availability, antennas, foreign agents in IPv4, access router in IPv6, and so forth. It is thus advantageous to use a blend of information available at layer 2 and layer 3 to select the proper AP or wireless network device.

Connecting a router to an access point (acting as a 802.11 bridge) via standard Ethernet port does not allow detailed monitor of radio resources from the router engine therefore limiting the capabilities of taking layer 3 decisions with layer 2 (i.e. radio) information.

Using an aspect of the invention, a router having one or more wireless network devices monitors the radio signals from APs it can hear and associates with the AP, i.e., becomes a STA to the WLAN of that AP using a blend information available at layer 2 and layer 3 to select the proper AP or wireless network device. This can occur prior to the router associating with any AP, while without benefit of the invention, gathering such layer 3 information requires first associating with an AP.

One embodiment of each of the processes described herein is in the form of a computer program that executes on a processing system, e.g., a one or more processors in a station in the wireless network. Thus, as will be appreciated by those skilled in the art, embodiments of the present invention may be embodied as a method, an apparatus such as a special purpose apparatus, an apparatus such as a data processing system, a wireless station, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate one or more processor of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should be appreciated that the present invention is not limited to any particular communication system, device(s), or architectures, but rather, the invention may find use in various types of communication systems.

The term data unit typically refers to a protocol data unit of information. Thus a packet, a frame, etc., each refers to a data unit.

Thus, while the present invention has been described in terms of specific embodiments, the invention is not limited to these specific embodiments. Rather, the scope of the invention is defined by the following claims and other embodiments are within the scope of the claims.

For example, the description above describes a station that includes a wireless network device. After the station associates with a WLAN, the wireless network device provides a bi-directional interface to the WLAN. Wireless network devices that have several simultaneous channels are known, and each channel is then capable of providing a bi-directional interface to a WLAN. It should be appreciated that this is essentially the same as a station that includes more than one wireless network device, so that when the description herein mentions a station that includes a plurality of wireless network devices, each capable of providing a bi-directional interface to an associated WLAN, this includes the case of the station having one or more wireless interfaces, one or more of which are capable of providing a plurality of bi-directional interfaces.

While one or more embodiments have been described for operation according to the IEEE 802.11 standard in its various forms, the invention is not restricted to the IEEE 802.11 standard, and may be applicable to other WLAN or communication standards, including, for example, bluetooth, GSM, PHS, and other cellular wireless telephony standards, wherever it is desired to recognize at L2 of a wireless station whether or not a WLAN or another station can provide mobile IP services, e.g., is in communication with one or more mobility agents. Other such applications include wireless Ethernet, Hiperlan I, Hiperlan II, and multimedia mobile access communication (MMAC) systems, local multiunit distribution service (LMDS) IF strips, wireless digital video, wireless USB links, wireless IEEE 1394 links, TDMA packet radios, low-cost point-to-point links, voice-over-IP portable "cell phones" (wireless Internet telephones), and so forth.

Note that while the data structure that contains information on APs that the STA can hear is called the WLAN database herein, the invention is not restricted to using a traditional database, e.g., a table as the data structure is not required to be in the form of a traditional database, e.g., a table as the structure for the WLAN database. Any data structure that can maintain the required information may be used. In one embodiment, the AP data structure is a table. In another embodiment, the data structure is a list. Other data structures also are possible, as would be clear to those in the art, and the invention is not restricted to any particular form for the WLAN database.

While embodiments of the invention use Cisco System Inc.'s SAA for obtaining network metrics, other embodiments of the invention use other network measurement tools that obtain network performance metrics. Many such other tools exist. Many use the Internet Control Message Protocol (ICMP) Echo Operation that sends ICMP packets to measure end-to-end response time between the STA, e.g., the STA acting as a mobile router and any IP-enabled device, e.g., an AP to measure the radio link, or a mobility agent reachable from the AP. See for example, U.S. Pat. No. 6,363,056 to Beigi et al. for one method to measure routn trip time (RTR). See the list of tools in Professor Henning Schulzrinne: "Measurement Tools" Computer Science Department, Columbia University, available on the Web from Professor Henning Schulzrinne at http://www.cs.columbia.edu/~hgs/internet/tools.html, incorporated herein by reference. See also the list of tools in Cooperative Association for Internet Data Analysis (CAIDA), "Performance Measurement Tools Taxonomy," available from Cooperative Association for Internet Data Analysis on the Web at http://www.caida.org/tools/taxonomy/performance.xml, incorporated herein by reference. No suggestion is being made here that all tools in these lists are suitable for use in embodiments of the invention, or that the lists are complete lists of measurement tools. The lists are included here to demonstrate that many tools are known for measuring such metrics as the round trip time (RTT) and other measures of latency.

Note that the term response time is used herein synonymously with delay. The delay (or latency may be one-way, or round trip. In such a case, the delay or response time is the round trip time.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A method of operating a wireless station having a wireless network device, the device capable of providing a layer-2 (L2) interface to a wireless network, the method comprising:
   without the station required to have previously been or to now be associated with a wireless network, wirelessly receiving L2 data units transmitted from one or more wireless access points (APs) of one or more wireless networks that the station can hear, wherein the L2 data units being wirelessly received include network layer (L3) information; and
   without the station required to have previously been or to now be associated with a wireless network via the wireless network device, the wireless station gathering information about the received L2 data units that include L3 information, including L2 information and L3 information included with the L2 data units,
   such that the station can select whether or not to associate with a wireless network according to one or more selection criteria, including the L3 information gathered by the station at in the received L2 data units, without needing to previously be associated with any wireless network.

2. A method as recited in claim 1,
   wherein the L3 information gathered at L2 for an AP includes whether the AP is sending one or more L3 packets from one or more mobility agents,
   such that the station may associate with a wireless network that is in communication with a mobility agent.

3. A method as recited in claim 1,
   wherein the station includes one or more wireless network devices each capable of providing a link-layer interface to a wireless network, and
   wherein the receiving is of L2 data units from APs that each of the wireless network devices can hear,
   the method further comprising:
      based on the gathered information, emulating at L2 one or more interfaces to one or more wireless networks whose APs the one or more wireless network devices can hear as if the station was associated to the wireless network via the device without there necessarily being any association with the wireless network, each emulated interface thus forming a floating interface to a wireless network via a wireless network device that after association can become an actual interface to the wireless network via the wireless network device; and
      storing information about the floating interfaces in a database.

4. A method as recited in claim 3, wherein the information stored about each floating interface includes:
   a unique identifier of the wireless network of the floating interface;
   and the state of the floating interface to the wireless network;

an indication of the quality of communication via the floating interface, including one or more of the network performance metrics; and
one or more L3 advertisements from one or more IP-enabled service providers that the AP of the WLAN transmits.

5. A method as recited in claim 4,
wherein the station includes a plurality of wireless network devices each capable of providing an interface to a wireless network, and
wherein the database further includes an indication of which wireless network device the floating interface is for.

6. A method as recited in claim 4, wherein the information stored about each floating interface includes an indication of any mobility information contained in any L3 information in the received L2 information.

7. A method as recited in claim 4, wherein the database further stores an indication of which floating interface was the most recently used association to a wireless network.

8. A method as recited in claim 7, further comprising:
periodically updating the database of floating interfaces,
wherein the database includes a record for each floating interface, and wherein the record of the floating interface most recently used in an association is not evicted from the wireless network database.

9. A method as recited in claim 7, further comprising:
periodically updating the database of floating interfaces.

10. A method as recited in claim 1, further comprising:
for one or more access points of interest from which one or more L2 data units are received, the wireless station sending probe packets from the station via the access point of interest to determine one or more network performance metrics,
wherein the one or more selection criteria for the station to select whether or not to associate with a wireless network include one or more of the network performance metrics.

11. A method as recited in claim 10, further comprising:
storing information in a database about one or more wireless networks that the station can hear, including L2 information, L3 information, and one or more of the network performance metrics.

12. A method as recited in claim 11, wherein the sending of probe packets via the access point of interest includes:
associating with the access point of interest;
sending the probe packets to a target node;
receiving one or more responses from the target node;
determining the one or more network performance metrics; and
unassociating with the access point of interest.

13. A method as recited in claim 11, wherein the L2 data units from the APs of the one or more wireless networks that the station can hear conform to one of the IEEE 802.11 standards.

14. A method as recited in claim 11, wherein the information stored about each wireless network includes:
a unique identifier of the wireless network;
an indication of the quality of communication from the AP of the wireless network, including one or more of the network performance metrics; and
one or more L3 advertisements from one or more IP-enabled service providers that the AP of the WLAN transmits.

15. A method as recited in claim 14, wherein one or more of the IP-enabled service providers are mobility agents, such that an L3 process can select an AP to associate with from the wireless network database based on one or more of whether or not the AP is in communication with a mobility agent and the indication of the quality of communication.

16. A method as recited in claim 15,
wherein the mobility agent is a Mobile IP foreign agent sending IP packets conforming to IPv4 or an access router sending IP packets conforming to IPv6, and
wherein said station is a router that provides Mobile IP services,
such that after association with an AP in communication with the mobility agent, the station is mobile router.

17. A method as recited in claim 14, wherein the information stored about each wireless network further includes a timestamp of when the gathered information was last updated.

18. A method as recited in claim 14, wherein the performance metrics are between the station and a target node and include one or more metrics between the station and a target node of the set consisting of response time, one-way delay, jitter, packet loss statistics, data link switching peer tunnel performance, and one or more Website performance metrics such as DNS lookup, TCP connect and HTTP transaction time.

19. A method as recited in claim 14, wherein the one or more network performance metrics are obtained using Service Assurance Agent (SAA) under IOS.

20. A method as recited in claim 18, wherein the target node is the AP of the wireless network.

21. A method as recited in claim 18, wherein the target node is a mobility agent in communication with the AP of the wireless network.

22. A method as recited in claim 21, wherein the performance metrics include one or more of the number of endpoints registered with the mobility agent and the number of tunnels the mobility agent is supporting.

23. A method as recited in claim 18,
wherein the station includes a plurality of wireless network devices each capable of providing an interface to a wireless network, and
wherein the information stored about each wireless network further includes an indication of which wireless network device received the L2 data unit.

24. A method as recited in claim 18, wherein the database further stores an indication of which wireless network information is of the most recent association to a wireless network.

25. A method as recited in claim 24, further comprising:
periodically updating the database,
wherein the database includes a record for each wireless network, and wherein the record of the most recently associated wireless network is not evicted from the database.

26. A method as recited in claim 18, further comprising:
periodically updating the database.

27. A method as recited in claim 26, wherein the updating of an entry is attempted only if the entry is stale and not expensive.

28. A method as recited in claim 14, wherein the database entries are in an order according to one or more ordering criteria.

29. A method as recited in claim 28, wherein the ordering criteria are related to the selection criteria.

30. A method as recited in claim 14, further comprising:
prior to the station being associated with a wireless network, L3 accepting one or more L3 packets found in the gathering step.

31. A method as recited in claim 30, wherein the accepting by L3 is in an order according to one or more ordering criteria.

32. A method as recited in claim 30, further comprising:
associating with a particular wireless network from where an L2 data unit was received that contains a particular L3 packet containing a mobility agent advertisement,
such that after the associating, the wireless network interface of the station provides an interface to the particular wireless network that is in communication with the mobility agent that sent the particular L3 packet.

33. A method as recited in claim 32, further comprising:
after the associating, determining that a re-association is necessary;
selecting for re-associating a wireless network according to one or more re-association criteria; and
re-associating with the selected wireless network.

34. A method as recited in claim 33, wherein the re-association criteria include that the selected wireless network is in communication with the mobility agent that the station was registered with at the time of the determining that a re-association is necessary.

35. A method as recited in claim 32,
wherein the mobility agent that sent the particular mobility agent advertisement is a Mobile IP foreign agent sending IP packets conforming to IPv4 or an access router sending IP packets conforming to IPv6, and
wherein said station is a router that provides Mobile IP services,
such that after association with an AP in communication with the mobility agent that sent the particular mobility agent advertisement, the station is mobile router.

36. A method as recited in claim 35, further comprising:
after the association with an AP in communication with the mobility agent, locking the association.

37. A method as recited in claim 14, wherein the gathering information prior to associating includes:
emulating one or more interfaces to one or more wireless networks that the station can hear, each said emulated interface thus forming a floating interface that after association can become an actual interface to a wireless network that is in communication with one or the IP-enabled service providers.

38. A method as recited in claim 14, further comprising:
selecting a wireless network for association whose AP the station can hear, the selecting according to the one or more selection criteria,
wherein at least one of the selection criteria uses at least some of the gathered information.

39. A method as recited in claim 38, wherein the selection criteria include that the L2 data unit received from the AP of the selected wireless network includes a mobility agent advertisement, such that after association, the station is in communication with a mobility agent.

40. A method as recited in claim 39, further comprising:
associating with a particular selected wireless network from where an L2 data unit containing a particular mobility agent advertisement was received,
such that after the associating, the wireless network interface of the station provides an interface to the particular wireless network that is in communication with the mobility agent that sent the particular mobility agent advertisement.

41. A method as recited in claim 40, further comprising:
at L3 of the station, registering with the mobility agent by exchanging L3 packets with the mobility agent.

42. A method as recited in claim 41, further comprising:
after the associating, determining that a re-association is necessary;
selecting for re-associating a wireless network according to one or more re-association criteria; and
re-associating with the selected wireless network.

43. A method as recited in claim 40,
wherein the mobility agent that sent the particular mobility agent advertisement is a Mobile IP foreign agent sending IP packets conforming to IPv4 or an access router sending IP packets conforming to IPv6, and
wherein said station is a router that provides Mobile IP services,
such that after association with an AP in communication with the mobility agent that sent the particular mobility agent advertisement, the station is mobile router.

44. A method as recited in claim 14,
wherein the station includes one or more wireless network devices each capable of providing a link-layer interface to a wireless network, and
wherein the receiving is of L2 data units from APs that each of the wireless network devices can hear,
the method further comprising:
based on the gathered information, emulating at L2 one or more interfaces to one or more wireless networks whose APs the one or more wireless network devices can hear as if the station was associated to the wireless network via the device, without there necessarily being any association with any wireless network, each emulated interface thus forming a floating interface to a wireless network via a wireless network device that after association can become an actual interface to the wireless network via the wireless network device,
L3 accepting one or more L3 packets that were in L2 data units from one or more APs via one or more of the floating interfaces as if the station was associated with the one or more APs whose L2 data units included the L3 packets.

45. A method as recited in claim 44, wherein the accepting by L3 is in an order according to one or more ordering criteria.

46. A method as recited in claim 15, wherein the mobility agent is a Mobile IP foreign agent sending IP packets conforming to IPv4 or an access router sending IP packets conforming to IPv6.

47. In a wireless station that includes a processor, a memory, and a wireless network device, a method of operating the wireless station, comprising:
without the station required to have previously been or to now be associated with a wireless network, wirelessly receiving L2 data units transmitted from one or more wireless access points (APs) of one or more wireless networks that the station can hear, wherein the L2 data being received units include network layer (L3) information;
without the station required to have previously been or to now be associated with a wireless network, the wireless station gathering information about the received L2 data units that include L3 information, including L2 information and L3 information included with the L2 data units; and
maintaining a wireless network database in the memory, the wireless network database including for each wireless network whose access point the station can hear, the gathered L2 information and the gathered L3 information.

48. A method as recited in claim 47, for each wireless network whose access point the station can hear, the wireless network database includes:
- a unique identifier of the wireless network;
- an indication of the quality of communication between the station and the AP of the wireless network; and
- one or more L3 advertisements from one or more IP-enabled service providers that the AP of the wireless network transmits.

49. A method as recited in claim 48, wherein the indication of the quality of communication between the AP of the wireless network includes one or more network performance metrics obtained by temporarily associating with the AP, sending one or more probe packets to the AP, and collecting the one or more network performance metrics.

50. A method as recited in claim 49, wherein one or more network performance metrics between the station and a particular AP is further stored at the particular AP.

51. A method as recited in claim 49, wherein the wireless network operates under one of the IEEE 802.11 standards.

52. A method as recited in claim 49, wherein the one or more network performance metrics include one or more of the set of metrics consisting of response time, one-way delay, jitter, packet loss statistics, data link switching peer tunnel performance, and one or more Website performance metrics such as DNS lookup, TCP connect and HTTP transaction time.

53. A method as recited in claim 49, wherein the one or more network performance metrics are obtained using Service Assurance Agent (SAA) under IOS.

54. A method as recited in claim 49, wherein one or more of the IP-enabled service providers are mobility agents, such that an L3 process can select an AP to associate with from the wireless network database based on one or more of whether or not the AP is in communication with a mobility agent and the indication of the quality of communication.

55. A wireless station comprising:
- a processor;
- a memory coupled to the processor; and
- a wireless network device coupled to the processor and capable of providing a link-layer (L2) interface to a wireless network;

the memory loadable with a protocol stack and instructions for the processor to carry out a method including:
- without the station required to have previously been or to now be associated with a wireless network, wirelessly receiving L2 data units transmitted from one or more wireless access points (APs) of one or more wireless networks that the station can hear, wherein the L2 data units being received include network layer (L3) information;
- without the station required to have previously been or to now be associated with a wireless network, the wireless station gathering information about the received L2 data units that include L3 information, including L2 information and L3 information included with the L2 data units; and
- maintaining a wireless network database in the memory, the wireless network database including for each wireless network whose access point the station can hear, the gathered L2 information and the gathered L3 information.

56. A wireless station as recited in claim 55, wherein, for each wireless network whose access point the station can hear, the wireless network database includes:
- a unique identifier of the wireless network;
- an indication of the quality of communication between the AP of the wireless network; and
- one or more advertisements from one or more IP-enabled service providers that the AP of the wireless network transmits.

57. A wireless station as recited in claim 56, wherein the indication of the quality of communication between the AP of the wireless network includes one or more network performance metrics obtained by the station temporarily associating with the AP, sending one or more probe packets to the AP, and collecting the one or more network performance metrics.

58. A wireless station as recited in claim 57, wherein one or more network performance metrics between the station and a particular AP is further stored at the particular AP.

59. A wireless station as recited in claim 57, wherein the wireless network operates under one of the IEEE 802.11 standards.

60. A wireless station as recited in claim 57, wherein the one or more network performance metrics include one or more of the set of metrics consisting of response time, one-way delay, jitter, packet loss statistics, data link switching peer tunnel performance, and one or more Website performance metrics such as DNS lookup, TCP connect and HTTP transaction time.

61. A wireless station as recited in claim 57, wherein the one or more network performance metrics are obtained using Service Assurance Agent (SAA) under IOS.

62. A wireless station as recited in claim 57, wherein one or more of the IP-enabled service providers are mobility agents, such that an L3 process can select an AP to associate with from the wireless network database based on one or more of whether or not the AP is in communication with a mobility agent and the indication of the quality of communication.

63. A computer readable medium configured with computer readable code segments that when executed by one or more processors cause carrying out a method, the one or more processors in a wireless station, the station having a memory coupled to the processors and a wireless network device, the device capable of providing a link-layer (L2) interface to a wireless network, the method comprising:
- without the station required to have previously been or to now be associated with a wireless network, wirelessly receiving L2 data units transmitted from one or more wireless access points (APs) of one or more wireless networks that the station can hear, wherein the L2 data units being received include network layer (L3) information;
- without the station required to have previously been or to now be associated with a wireless network, the wireless station gathering information about the received L2 data units that include L3 information, including L2 information and L3 information included with the L2 data units; and
- maintaining a wireless network database in the memory, the wireless network database including for each wireless network whose access point the station can hear, the gathered L2 information and the gathered L3 information.

64. A computer readable medium as recited in claim 63, wherein, for each wireless network whose access point the station can hear, the wireless network database includes:
- a unique identifier of the wireless network;
- an indication of the quality of communication between the station and the AP of the wireless network; and
- one or more L3 advertisements from one or more IP-enabled service providers that the AP of the wireless network transmits.

65. A computer readable medium as recited in claim 64, wherein the indication of the quality of communication between the AP of the wireless network includes one or more network performance metrics obtained by temporarily associating with the AP, sending one or more probe packets to the AP, and collecting the one or more network performance metrics.

66. A computer readable medium as recited in claim 65, wherein one or more of the IP-enabled service providers are mobility agents, such that an L3 process can select an AP to associate with from the wireless network database based on one or more of whether or not the AP is in communication with a mobility agent and the indication of the quality of communication.

67. A wireless station comprising:
- a wireless network device;
- means for wirelessly receiving L2 data units transmitted from one or more wireless access points (APs) of one or more wireless networks that the station can hear, the wirelessly receiving by the means for wirelessly receiving without the station required to have previously been or to now be associated with a wireless network, wherein the L2 data units being received by the means for wirelessly receiving include network layer (L3) information;
- means for gathering information about the received L2 data units, including L2 information and L3 information included with the L2 data units, the gathering by the means for gathering without the station required to have previously been or to now be associated with a wireless network; and
- memory means for maintaining a wireless network database, the wireless network database including for each wireless network whose access point the station can hear, the gathered L2 information and the gathered L3 information that was included in the gathered L2 information.

68. A wireless station as recited in claim 67, wherein, for each wireless network whose access point the station can hear, the wireless network database includes:
- a unique identifier of the wireless network;
- an indication of the quality of communication between the station and the AP of the wireless network; and
- one or more L3 advertisements from one or more IP-enabled service providers that the AP of the wireless network transmits.

69. A wireless station as recited in claim 68, wherein the station includes means for collecting the one or more network performance metrics between the station and a target node via the AP, and wherein the indication of the quality of communication between the AP of the wireless network includes one or more network performance metrics obtained using the means for collecting.

70. A wireless station as recited in claim 68, wherein a particular AP includes means for storing or more network performance metrics, and wherein the one or more network performance metrics between the station and the particular AP is further stored by the means for storing.

71. A wireless station as recited in claim 69, wherein the wireless network operates under one of the IEEE 802.11 standards.

72. A wireless station as recited in claim 69, wherein the one or more network performance metrics include one or more of the set of metrics consisting of response time, one-way delay, jitter, packet loss statistics, data link switching peer tunnel performance, and one or more Website performance metrics such as DNS lookup, TCP connect and HTTP transaction time.

73. A wireless station as recited in claim 69, wherein the means for collecting the one or more network performance metrics includes Service Assurance Agent (SAA) operating under IOS.

74. A wireless station as recited in claim 69, wherein one or more of the IP-enabled service providers are mobility agents, such that an L3 process can select an AP to associate with from the wireless network database based on one or more of whether or not the AP is in communication with a mobility agent and the indication of the quality of communication.

\* \* \* \* \*

UNITED STATES PATENT AND TRADEMARK OFFICE
CERTIFICATE OF CORRECTION

PATENT NO. : 7,613,142 B2
APPLICATION NO. : 10/274600
DATED : November 3, 2009
INVENTOR(S) : Molteni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1712 days.

Signed and Sealed this

Nineteenth Day of October, 2010

David J. Kappos
*Director of the United States Patent and Trademark Office*